US008627689B2

(12) United States Patent
Finch et al.

(10) Patent No.: US 8,627,689 B2
(45) Date of Patent: Jan. 14, 2014

(54) ENERGY MANAGEMENT OF CLOTHES WASHER APPLIANCE

(75) Inventors: Michael F. Finch, Louisville, KY (US); John Besore, Prospect, KY (US); Jeff Donald Drake, Louisville, KY (US); Darin Franks, Lanesville, IN (US); Chad Michael Helms, Louisville, KY (US); Jerrod Aaron Kappler, Louisville, KY (US); Steven Keith Root, Buckner, KY (US); Natarajan Venkatakrishnan, Louisville, KY (US); Eric K. Watson, Crestwood, KY (US); Joshua S. Wiseman, Elizabethtown, KY (US)

(73) Assignee: General Electric Company, Schenectady, NY (US)

( * ) Notice: Subject to any disclaimer, the term of this patent is extended or adjusted under 35 U.S.C. 154(b) by 1044 days.

(21) Appl. No.: 12/559,751

(22) Filed: Sep. 15, 2009

(65) Prior Publication Data
US 2010/0146712 A1    Jun. 17, 2010

Related U.S. Application Data

(60) Provisional application No. 61/097,082, filed on Sep. 15, 2008.

(51) Int. Cl.
*D06F 33/00*    (2006.01)
(52) U.S. Cl.
USPC ........................................ 68/12.12; 68/12.16
(58) Field of Classification Search
USPC .................. 68/12.02, 12.12, 12.16, 12.21
See application file for complete search history.

(56) References Cited

U.S. PATENT DOCUMENTS

| 2,545,054 A | 3/1951 | Stitz |
| 3,683,343 A | 8/1972 | Feldman et al. |
| 3,720,073 A | 3/1973 | McCarty |
| 4,048,812 A | 9/1977 | Thomason |
| 4,167,786 A | 9/1979 | Miller et al. |
| 4,190,756 A | 2/1980 | Foerstner |

(Continued)

FOREIGN PATENT DOCUMENTS

| CN | 1692317 A | 11/2005 |
| CN | 101013979 A | 8/2007 |

(Continued)

OTHER PUBLICATIONS

International Search Report from PCT Application No. PCT/US2009/056878, Nov. 17, 2009.

(Continued)

*Primary Examiner* — Joseph L Perrin
(74) *Attorney, Agent, or Firm* — Global Patent Operation; Marc A. Vivenzio

(57) ABSTRACT

A clothes washer is provided comprising one or more power consuming functions and a controller in signal communication with an associated utility. The controller can receive and process a signal from the associated utility indicative of current state of an associated utility. The controller operates the clothes washer in one of a plurality of operating modes, including at least a normal operating mode and an energy savings mode in response to the received signal. The controller is configured to change the power consuming functions by adjusting one or more of an operation schedule, an operation delay, an operation adjustment, and a selective deactivation of at least one of the one or more power consuming functions to reduce power consumption of the clothes washer in the energy savings mode.

15 Claims, 24 Drawing Sheets

(56) References Cited

U.S. PATENT DOCUMENTS

| | | |
|---|---|---|
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,903,502 A | 2/1990 | Hanson et al. |
| 4,998,024 A | 3/1991 | Kirk et al. |
| 5,040,724 A | 8/1991 | Brinkruff et al. |
| 5,137,041 A | 8/1992 | Hall et al. |
| 5,183,998 A | 2/1993 | Hoffman et al. |
| 5,220,807 A | 6/1993 | Bourne et al. |
| 5,224,355 A | 7/1993 | So et al. |
| 5,230,467 A | 7/1993 | Kubsch et al. |
| 5,289,362 A | 2/1994 | Liebl et al. |
| 5,408,578 A | 4/1995 | Bolivar |
| 5,430,430 A | 7/1995 | Gilbert |
| 5,451,843 A | 9/1995 | Kahn et al. |
| 5,462,225 A | 10/1995 | Massara et al. |
| 5,479,157 A | 12/1995 | Suman et al. |
| 5,479,558 A | 12/1995 | White et al. |
| 5,481,140 A | 1/1996 | Maruyama et al. |
| 5,495,551 A | 2/1996 | Robinson et al. |
| 5,504,306 A | 4/1996 | Russell et al. |
| 5,505,377 A | 4/1996 | Weiss |
| 5,515,692 A | 5/1996 | Sterber et al. |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,761,083 A | 6/1998 | Brown et al. |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,937,942 A | 8/1999 | Bias et al. |
| 5,956,462 A | 9/1999 | Langford |
| 6,018,150 A | 1/2000 | Maher, Jr. |
| 6,026,651 A | 2/2000 | Sandelman |
| 6,080,971 A | 6/2000 | Seitz |
| 6,118,099 A | 9/2000 | Lake |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 | 10/2003 | Ghent et al. |
| 6,694,753 B1 | 2/2004 | Lanz et al. |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,860,431 B2 | 3/2005 | Jayadev |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,010,363 B2 | 3/2006 | Donnelly et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 | 6/2006 | Huffington et al. |
| 7,082,380 B2 | 7/2006 | Wiebe et al. |
| 7,110,832 B2 | 9/2006 | Ghent |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,541,941 B2 | 6/2009 | Bogolea et al. |
| 7,561,977 B2 | 7/2009 | Horst et al. |
| 7,565,813 B2 | 7/2009 | Pouchak |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 | 5/2012 | Besore |
| 8,190,302 B2 | 5/2012 | Burt et al. |
| 8,355,748 B2 | 1/2013 | Abe et al. |
| 8,367,984 B2 | 2/2013 | Besore et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 | 12/2003 | Horst et al. |
| 2004/0024483 A1 | 2/2004 | Holcombe |
| 2004/0034484 A1 | 2/2004 | Solomita et al. |
| 2004/0098171 A1 | 5/2004 | Horst |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 | 12/2004 | Donnelly et al. |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 | 2/2006 | Harkcom et al. |
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0190139 A1 | 8/2006 | Reaume et al. |
| 2006/0208570 A1 | 9/2006 | Christian et al. |
| 2006/0272830 A1 | 12/2006 | Fima et al. |
| 2006/0276938 A1 | 12/2006 | Miller |
| 2006/0289436 A1 | 12/2006 | Carbone et al. |

(56) References Cited

U.S. PATENT DOCUMENTS

| | | |
|---|---|---|
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1 | 7/2008 | Gerstemeier et al. |
| 2008/0172312 A1 | 7/2008 | Synesiou et al. |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1 | 9/2008 | Flohr |
| 2008/0258633 A1 | 10/2008 | Voysey |
| 2008/0272934 A1 | 11/2008 | Wang et al. |
| 2008/0277487 A1 | 11/2008 | Mueller et al. |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1 | 7/2009 | Harrod et al. |
| 2009/0235675 A1 | 9/2009 | Chang et al. |
| 2009/0240381 A1 | 9/2009 | Lane |
| 2009/0326728 A1 | 12/2009 | Chrisop et al. |
| 2010/0017242 A1 | 1/2010 | Hamilton et al. |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056901, Nov. 10, 2009.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
Search Report from EP Application No. 10153695.1, May 24, 2012.
Lemay et al., An Integrated Architecture for Demand Response Communications and Control, University of Illinois Urbana-Champaign, Oct. 28, 2008.
Real-Time Feedback, Natural Resources Canada via website www.nrcan.gc.ca , 2008, http://oee.nrcan.gc.ca/publications/equipment/10918.
PCT Application No. PCT/US09/56911, Search Report, Mar. 10, 2010.
Search Report from CN Application No. 201010135268.8 dated Oct. 24, 2012.
Weisstein, Eric W. "At Least One.", From MathWorld—A Wolfram Web Resource. http://mathworld.wolfram.com/AtLeastOne.html, p. 1.

| | | | |
|---|---|---|---|
| REFRIGERATOR | REFR UI RESPONSE (DSM DISABLED) | DURING OPERATION | NORMAL DISPLAY |
| | REFR UI RESPONSE (DSM ENABLED) | DURING OPERATION | DISPLAY "ECO RATE LOW-NORMAL OPERATION" |
| WASHER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | WASHER UI RESPONSE (DSM ENABLED) | PRIOR TO OPERATION | NORMAL DISPLAY |
| | WASHER UI RESPONSE (DSM ENABLED) | DURING OPERATION | NORMAL DISPLAY |
| DRYER | DRYER UI RESPONSE (DSM DISABLED) | PRIOR TO OPERATION | NORMAL DISPLAY |
| | DRYER UI RESPONSE (DSM DISABLED) | DURING OPERATION | NORMAL DISPLAY |
| | DRYER UI RESPONSE (DSM ENABLED) | PRIOR TO OPERATION | NORMAL DISPLAY |
| | DRYER UI RESPONSE (DSM ENABLED) | DURING OPERATION | NORMAL DISPLAY |
| RANGE | RANGE UI RESPONSE (DSM DISABLED OR NORMAL) | PRIOR TO OPERATION | NORMAL DISPLAY |
| | | DURING OPERATION | NORMAL DISPLAY |
| | RANGE UI RESPONSE (DSM ENABLED) | PRIOR TO OPERATION | NORMAL DISPLAY |
| | | DURING OPERATION | NORMAL DISPLAY |
| DISHWASHER | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |
| MWO | DISHWASHER UI RESPONSE (DSM DISABLED OR NORMAL) | PRIOR TO OPERATION | NORMAL DISPLAY |
| | | DURING OPERATION | NORMAL DISPLAY |
| | DISHWASHER UI RESPONSE (DSM ENABLED) | PRIOR TO OPERATION | NORMAL DISPLAY |
| | | DURING OPERATION | NORMAL DISPLAY |

MATCH TO FIG. 9B

Fig. 9A

| MEDIUM | HIGH | CRITICAL |
|---|---|---|
| NORMAL DISPLAY | NORMAL DISPLAY | NORMAL DISPLAY |
| DISPLAY "ECO RATE MEDIUM-NORMAL OPERATION" | DISPLAY "ECO RATE HIGH - FEATURES DELAYED" | DISPLAY "ECO RATE CRITICAL - FEATURES DELAYED" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "DELAY ECO" | DISPLAY "DELAY ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| DISPLAY "ECO" | DISPLAY "ECO" | DISPLAY "ECO" |
| DISPLAY "ECO" | DISPLAY "ECO" | DISPLAY "ECO" |
| NORMAL DISPLAY | NORMAL DISPLAY | NORMAL DISPLAY |
| NORMAL DISPLAY | NORMAL DISPLAY | NORMAL DISPLAY |
| NORMAL DISPLAY | DISPLAY "ECO" | DISPLAY "ECO" |
| NORMAL DISPLAY | DISPLAY "ECO" | DISPLAY "ECO" |

MATCH TO FIG. 9A

*Fig. 9B*

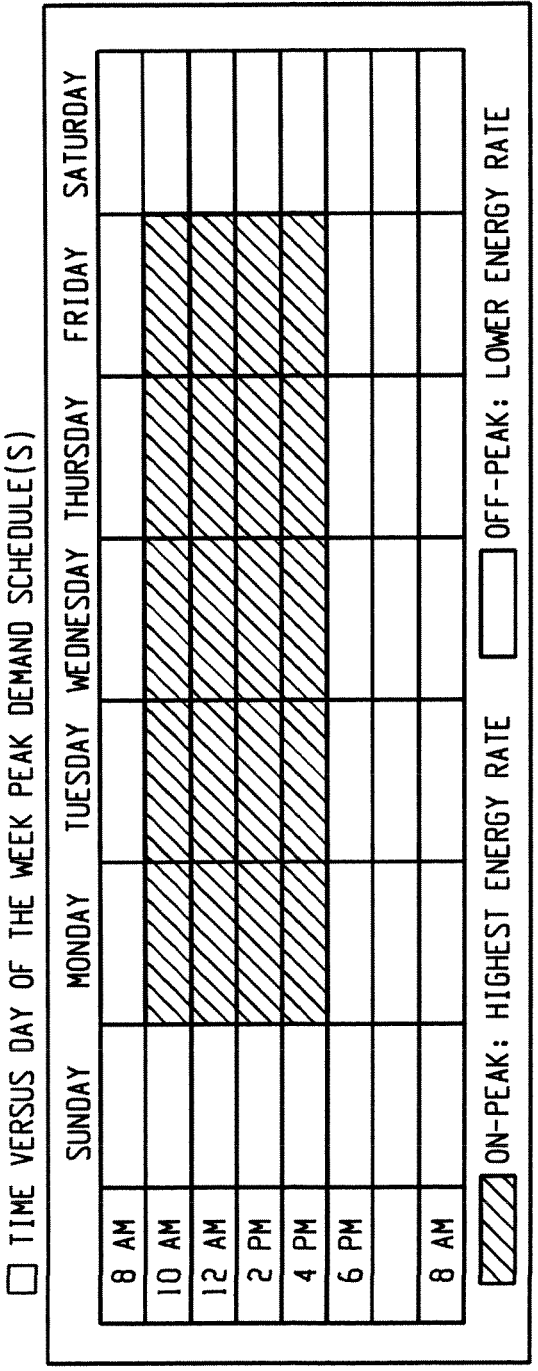

ELECTRIC POWER UTILITY - TIME OF USE - AS APPLIED TO REFRIGERATION

BACKGROUND

TIME-OF-USE IS A VOLUNTARY ELECTRIC UTILITY PROGRAM WHICH ALLOWS A CONSUMER TO PURCHASE LOWER PRICED ELECTRIC POWER BY USING POWER WHEN THE "GRID" ELECTRIC DEMAND IS LESS. THE TIME-OF-USE SCHEDULE IS GENERALLY WORKED OUT WITH THE REGIONAL POWER COMPANY AND LEGISLATORS AND THE SCHEDULE IS WELL KNOWN AND EASILY OBTAINED BY THE CONSUMER.

PARTS OF THE SYSTEM

SYSTEM IMPLEMENTATION HAS THREE UNIQUE CATEGORIES AND ARE LISTED BELOW:

(1) METHOD OF INPUTTING THE TIME-OF-USE SCHEDULE (A) CONSUMER ZIP CODE ENTRY - REQUIRES A DATABASE MANAGED BY GE AND UPGRADEABLE (B) TIME VERSUS DAY OF THE WEEK PEAK DEMAND SCHEDULE WITH USER INPUT - REQUIRES INITIAL INPUT BY CONSUMER AND DATABASE MANAGED BY USER WHEN CHANGES HAPPEN (2) ELECTRONIC CIRCUIT CHANGES REQUIRED - CIRCUITRY THAT KEEPS TIME WILL BE REQUIRED AND SOFTWARE TO INTERACT WITH THE TIME-OF-USE SCHEDULE INPUT AND ACTIONS WOULD BE REQUIRED (A) ONE METHOD WOULD BE A ZERO CROSS (B) ANOTHER METHOD WOULD BE A CLOCK CALENDAR IC WITH CAPACITOR OR BATTERY BACKUP (3) A LIST OF ACTIONS THAT COULD BE PERFORMED AT TIMES WHEN THE ELECTRIC RATES ARE OFF PEAK (A) DELAY DEFROST UNTIL OFF PEAK (B) PRECHILL WHEN NEARING PEAK DEMAND TO KEEP THE COMPRESSOR USAGE AT A MINIMUM DURING PEAK DEMAND (C) ALERT USER WHEN PEAK DEMAND IS ON WHEN THE DOORS ARE OPENED (LIGHT ELECTRIC DRAW) OR WHEN THE ICE DISPENSER IS USED DURING PEAK DEMAND

*Fig. 11*

SCE TOU

TIME OF USE - DOMESTIC PRICING - RATE 1
TOU-D-1 PRICING
METER CHARGE          $2.00 MONTHLY

RATES UNDER 600 KW/MONTH AS OF 11/29/2007
|  | SUMMER | WINTER |
|---|---|---|
| ON-PEAK(10-6) | $0.3591 | $0.2140 |
| OFF PEAK | $0.1866 | $0.1783 |

RATES OVER 600 KW/MONTH AS OF 11/29/2007
|  | SUMMER | WINTER |
|---|---|---|
| ON-PEAK(10-6) | $0.2970 | $0.1846 |
| OFF PEAK | $0.1634 | $0.1570 |

SUMMER    FIRST SUNDAY IN JUNE TO FIRST SUNDAY IN OCTOBER

ON-PEAK AND OFF-PEAK HOURS

| | MONDAY | TUESDAY | WEDNESDAY | THURSDAY | FRIDAY | SATURDAY | SUNDAY |
|---|---|---|---|---|---|---|---|
| 8 AM | | | | | | | |
| 10 AM | ▨ | ▨ | ▨ | ▨ | ▨ | | |
| | ▨ | ▨ | ▨ | ▨ | ▨ | | |
| 6 PM | | | | | | | |
| 8 AM | | | | | | | |

▨ ON-PEAK: HIGHEST ENERGY RATE    ☐ OFF-PEAK: LOWER ENERGY RATE (LOGO)

FOR MORE INFORMATION
SCE OFFERS OTHER PROGRAMS TO HELP YOU BETTER MANAGE YOUR ELECTRICITY COSTS, SUCH AS REBATES, INCENTIVES, ENERGY SURVEYS AND PAYMENT OPTIONS. IF YOU HAVE QUESTIONS ABOUT THIS RATE SCHEDULE OR OTHER PROGRAMS, PLEASE CONTACT YOUR SCE ACCOUNT REPRESENTATIVE. CALL (XXX) XXX-XXXX, OR VISIT US AT www.xxxxx.com

ANNUAL 570KW REFRIGERATOR OPERATING COST

~$103 W/O TOU (24/7 CONSTANT LOAD)

~$91 WITH TOU (ONLY TOU POWER (NOT REALISTIC))

SAVINGS COULD BE ~$12

*Fig. 12*

ENERGY CALCULATOR

| 6°F | 34°F | 92 | $0.06 |
|---|---|---|---|
| FREEZER TEMPERATURE | REFRIGERATOR TEMPERATURE | AVERAGE DOOR OPENINGS/WEEK | UNIT ELECTRICITY COST $/kWh |

|  | CURRENT SETTINGS | WITH CHANGES ABOVE |
|---|---|---|
| kWH PER YEAR | 4412 | 3074 |
| CO2 EMISSIONS | 23 TONS | 17 TONS |
| COST PER YEAR | $184.05 | $145.34 |

HOME | ICE CRUSHED | ICE CUBED | WATER | HELP

BACK

- INDICATES HOW MUCH SAVINGS CAN BE OBTAINED BY CHANGING ELEMENTS LIKE TEMPERATURE, DOOR OPENINGS OR ELECTRICITY COSTS.
- SHOWING CALCULATIONS OVER LONG PERIODS OF TIME (I.E. YEARLY) ARE OMPORTANT TO ILLUSTRATE MORE SUBSTANTIAL SAVINGS.

*Fig. 19*

A LIST OF ACTIONS THAT COULD BE PERFORMED AT TIMES WHEN THE ELECTRIC RATES ARE OFF PEAK

> DELAY DEFROST UNTIL OFF PEAK

> PRECHILL WHEN NEARING PEAK DEMAND TO KEEP THE COMPRESSOR USAGE AT A MINIMUM DURING PEAK DEMAND

> ALERT USER WHEN PEAK DEMAND IS ON - OCCURS WHEN THE DOOR WAS OPENED OR ICE CRUSHER USED, ETC.

*Fig. 20*

TITLE: APPLIANCE ACTIONS AND RESPONSE - DEMAND SIDE MANAGEMENT FOR HOME APPLIANCES
ABSTRACT: THE INVENTION(S) ARE THE APPLIANCE ACTIONS AND RESPONSES TO ELECTRIC UTILITY SIGNALS PROVIDED IN CONJUNCTION WITH A DEMAND SIDE MANAGEMENT (DSM) SYSTEM. THIS IS PART OF THE ADVANCED METERING INFRASTRUCTURE (AMI) INITIATIVE WHICH PROVIDES REMOTE METERING FUNCTIONS SUCH AS REMOTE METER READING, DEMAND SIGNALING/LOAD CONTROL, ETC.. THE ATTACHED DOCUMENT DESCRIBES IN BRIEF DETAIL ACTIONS AND RESPONSES TO DSM SIGNALING.

UPON RECEIVING A HIGH PRICE ENERGY SIGNAL THE USER MAY SET THE UNIT TO:

a) DELAY ALL SPECIAL MODES UNTIL THE LOW PRICED ENERGY SIGNAL IS RECEIVED. MODE EXAMPLES ARE:

i. ICE MAKER ii. BEVERAGE CENTER iii. TURBO COOL iv. CUSTOM COOL v. QUICK ICE b) OVERRIDE THE HIGH PRICED ENERGY SIGNAL, ALWAYS OR BASED ON A CERTAIN $/Kwh LEVEL c) DELAY DEFROST UNTIL PEFORMANCE IS WOULD BE AFFECTED d) ANNOUNCE OR AUDIBLE ALERT OF THE "HIGH PRICED ENERGY SIGNAL" DURING A CYCLE e) VISUALLY ALERT USER OF THE "HIGH PRICED ENERGY" SIGNAL f) DISPLAY THE COST OF RUNNING THE UNIT IN THE SELECTED MODE OF OPERATION g) DISPLAY THE COST OF ENERGY AT THE PRESENT TIME h) DISABLE LIGHTING i) TURN OFF SWEAT HEATERS

*Fig. 21*

ENERGY MANAGEMENT OF CLOTHES WASHER APPLIANCE

CROSS REFERENCE TO RELATED APPLICATIONS

The present application claims priority from U.S. Provisional Patent Application Ser. No. 61/097,082 filed 15 Sep. 2008, now Ser. No. 12/559,703, filed 15 Sep. 2009; which provisional patent application is expressly incorporated herein by reference, in its entirety. In addition, cross-reference is made to commonly owned, copending application Ser. No. 12/559,636, filed 15 Sep. 2009; Ser. No. 12/559,528, filed 15 Sep. 2009; Ser. No. 12/559,539, filed 15 Sep. 2009; Ser. No. 12/559,654, filed 15 Sep. 2009; Ser. No. 12/559,581, filed 15 Sep. 2009; Ser. No. 12/559,550, filed 15 Sep. 2009; Ser. No. 12/559,597; filed 15 Sep. 2009; Ser. No. 12/559,705, filed 15 Sep. 2009; Ser. No. 12/559,561, filed 15 Sep. 2009; Ser. No. 12/559,577, filed 15 Sep. 2009; and Ser. No. 12/559,684, filed 15 Sep. 2009.

BACKGROUND

This disclosure relates to energy management, and more particularly to energy management of household consumer appliances. The disclosure finds particular application to changing existing appliances via add-on features or modules, and incorporating new energy saving features and functions into new appliances.

Currently utilities charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened.

One proposed third party solution is to provide a system where a controller "switches" the actual energy supply to the appliance or control unit on and off. However, there is no active control beyond the mere on/off switching. It is believed that others in the industry cease some operations in a refrigerator during on-peak time.

For example, in a refrigerator most energy is consumed to keep average freezer compartment temperature at a constant level. Recommended temperature level is based on bacteria multiplication. Normally recommended freezer temperature for long (1-2 month) food storage is 0 degrees F. Research shows that bacteria rise is a linear function of the compartment temperature, i.e., the lower the temperature the lower the bacteria multiplication. Refrigerator designers now use this knowledge to prechill a freezer compartment (and in less degree a refrigerator compartment also) before defrost, thus keeping an average temperature during time interval that includes before, during, and after defrost at approximately the same level (for example, 0 degrees F.).

There are also currently different methods used to determine when variable electricity-pricing schemes go into effect. There are phone lines, schedules, and wireless signals sent by the electrical company. One difficulty is that no peak shaving method for an appliance such as a refrigerator will provide a maximal benefit. Further, different electrical companies use different methods of communicating periods of high electrical demand to their consumers. Other electrical companies simply have rate schedules for different times of day.

Electrical utilities moving to an Advanced Metering Infrastructure (AMI) system will need to communicate to appliances, HVAC, water heaters, etc. in a home or office building. All electrical utility companies (more than 3,000 in the US) will not be using the same communication method to signal in the AMI system. Similarly, known systems do not communicate directly with the appliance using a variety of communication methods and protocols, nor is a modular and standard method created for communication devices to interface and to communicate operational modes to the main controller of the appliance. Although conventional WiFi/ZigBee/PLC communication solutions are becoming commonplace, this disclosure introduces numerous additional lower cost, reliable solutions to trigger "load shedding" responses in appliances or other users of power. This system may also utilize the commonplace solutions as parts of the communication protocols.

BRIEF DESCRIPTION

The present disclosure reduces power consumption during on-peak hours by reducing the energy demand on the power generation facility, and also enabling the user/consumer to pay less to operate the appliance on an annual basis. A controller is configured to receive and process a signal indicative of current state of an associated energy supplying utility. The controller operates the cooking appliance in one of a plurality of operating modes, including at least a normal operating mode and an energy savings mode, in response to the received signal.

This disclosure is a low-cost alternative to using expensive or complicated methods of determining when peak electrical rates apply. For example, when the refrigerator is in peak shaving mode (or it could be programmed to do this constantly), an ambient light sensor determines when it is morning, and then stays in energy-saving mode for a predetermined number of hours. Preferably, the system will need a counter to know that the room has been dark for a predetermined number of hours. When the lights come on for a certain length of time, then the system knows, for example, that it is morning. A state for an associated energy supplying utility is determined. The utility state is indicative of at least a peak demand period or an off-peak demand period.

This disclosure provides a peak-shaving appliance such as a refrigerator, including a method to determine when to go into peak-shaving mode without using additional components, or components that have another purpose, and provides a high percentage of the maximum benefit for negligible cost. The two components needed for this are an ambient light sensor and a timer. The kitchen will be dark for an extended period of time while everyone is sleeping. The light sensor and the timer will be used to determine that it is nighttime and morning can be determined by the light sensor. When the refrigerator determines it is morning, the timer will be used to initiate peak shaving mode after some delay time. For example, peak shaving mode could start three hours after it is determined morning starts. Similarly, the ambient light sensor can also be used for dimming the refrigerator lights. This disclosure advantageously uses ambient light to determine when to start peak shaving. A controller is configured to receive and process an energy signal. The signal has a first state indicative of a utility peak demand period and a second state indicative of a utility off-peak demand period. The controller operates the cooking appliance in one of an energy savings mode and a normal operating mode based on the received signal being in the first and second states respectively.

An appliance interface can be provided for all appliances leaving the module to communicate with the AMI system. The system provides for appliance sales with a Demand Side Management capable appliance. The Demand Side Management Module (DSMM) is provided to control the energy consumption and control functions of an appliance using a communication method (including but not limited to PLC, FM, AM SSB, WiFi, ZigBee, Radio Broadcast Data System, 802.11, 802.15.4, etc.). The modular approach will enable an appliance to match electrical utility communication requirements. Each electrical utility region may have different communication methods, protocol methods, etc. This modular approach allows an appliance to be adapted to a particular geographical area of a consumer or a particular electrical provider. The module can be added as a follow on feature and applied after the appliance is installed. Typical installations could include an integral mounted module (inside the appliance or unit) or an externally mounted module (at the wall electrical receptacle or anywhere outside the appliance or unit). The module in this disclosure provides for 2 way communications if needed, and will provide for several states of operation—for example, 1) normal operation, 2) operation in low energy mode (but not off), and 3) operation in lowest energy mode.

This module could be powered from the appliance or via a separate power supply, or with rechargeable batteries. The rechargeable batteries could be set to charge under off-peak conditions. With the module powered from the appliance, the appliance could turn it off until the appliance needed to make a decision about power usage, eliminating the standby power draw of the module. If powered separately, the appliance could go to a low energy state or completely off, while the module continued to monitor rates.

Use of RFID tags in one proposed system should offer significant savings since the RFID tags have become very low cost due to the proliferation of these devices in retail and will effectively allow the enabled appliance to effectively communicate with the utility meter (e.g., receive signals from the utility meter). This system makes it very easy for a customer to manage energy usage during peak demand periods and lowers the inconvenience level to the customer by not shutting off appliances in the home by the utility. When local storage and local generation are integrated into the system, then cost savings are seen by the customer. This system also solves the issue of rolling brownouts/blackouts caused by excessive power demand by lowering the overall demand. Also, the system allows the customer to pre-program choices into the system that will ultimately lower utility demand as well as save the customer money in the customer's utility billing. For instance, the customer may choose to disable the defrost cycle of a refrigerator during peak rate timeframes. This disclosure provides for the controller to "communicate" with the internal appliance control board and command the appliance to execute specific actions with no curtailment in the energy supply. This disclosure further provides a method of communicating data between a master device and one or more slave devices using RFID technology. This can be a number of states or signals, either using one or more passive RFID tags that resonate at different frequencies resonated by the master, or one or more active RFID tags that can store data that can be manipulated by the master device and read by the slave device(s). The states in either the passive or active RFID tags can then be read by the microcontroller on the slave device(s) and appropriate functions/actions can be taken based upon these signals.

Another exemplary embodiment uses continuous coded tones riding on carrier frequencies to transmit intelligence, for example, when one is merely passing rate information such as rate 1, 2, 3, or 4, using the tones to transmit the signals. One could further enhance the details of the messaging by assigning a binary number to a given tone, thus allowing one to "spell out" a message using binary coding with multiple tones. The appliance microcomputer would be programmed to respond to a given number that would arrive in binary format.

One advantage of this approach is that customers have complete control of their power. There have been proposals by utilities to shut off customers if they exceed demand limits or increase the number of rolling brownouts. This method also gives a customer finer granularity in their home in terms of control. A customer does not have to load shed a room just to manage a single device.

This disclosure also advantageously provides modes of load shedding in the appliance, lighting, or HVAC other than "on/off" to make the situation more acceptable from the perspective of the customer.

In one aspect of the disclosure, a clothes washer is provided comprising one or more power consuming functions and a controller in signal communication with an associated utility. The controller receives and processes a signal from the associated utility indicative of current cost of supplied energy. The controller can operate the clothes washer in one of a normal operating mode and an energy savings mode based on the received signal. The controller is configured to change the power consuming functions by adjusting one or more of an operation schedule, an operation delay, an operation adjustment, and a selective deactivation of at least one of the one or more power consuming functions to reduce power consumption of the clothes washer in the energy savings mode.

In another aspect of the disclosure, a clothes washer control method is provided comprising: determining a cost of supplied energy from an associated utility, the cost being indicative of a peak demand period or an off-peak demand period; operating the clothes washer in a normal mode during the off-peak demand period; operating the clothes washer in an energy savings mode during the peak demand period; scheduling, delaying, adjusting and/or selectively deactivating any number of one or more power consuming features/functions of the clothes washer to reduce power consumption of the clothes washer in the energy savings mode; and, returning to the normal mode after the peak demand period is over.

An advantage of the present disclosure is the ability to produce appliances with a common interface and let the module deal with the Demand Side Management.

Another advantage is the ability to control functions and features within the appliance and/or unit at various energy levels, i.e., as opposed to just an on/off function.

Another advantage is that the consumer can choose the module or choose not to have the module. If the module is chosen, it can be matched to the particular electrical utility service provider communication method of the consumer.

Another benefit is the increased flexibility with an associated electrical service provider, and the provision of several modes of operation (not simply an on/off mode). The module can be placed or positioned inside or outside the appliance and/or unit to provide demand side management.

Still other benefits relate to modularity, the ability to handle multiple communication methods and protocols without adversely impacting the cost of the appliance, opening up appliances to a variety of protocols, enabling demand side management or energy management, and/or providing for a standard interface to the appliance (for example, offering prechill and/or temperature set change during on-peak hours).

Low cost, reliable RF transmissions within the home, rather than using industrial solutions such as PLC or Zigbee solutions which are significantly more costly than the aforementioned system.

Still other features and benefits of the present disclosure will become apparent from reading and understanding the following detailed description.

BRIEF DESCRIPTION OF THE DRAWINGS

FIGS. 1-8, 9A, 9B, and 10-21 illustrate exemplary embodiments of an energy management system for household appliances.

DETAILED DESCRIPTION

Figure 1:
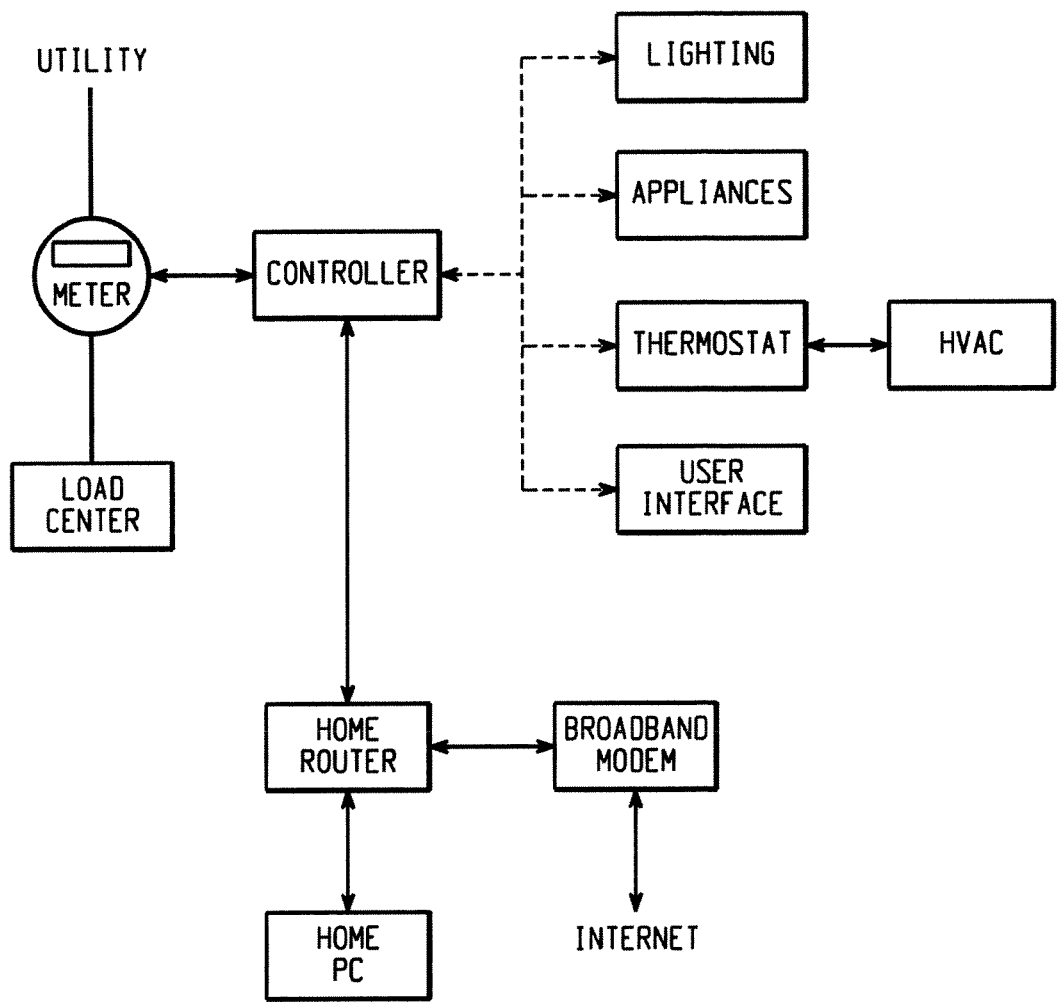
Figure 2:
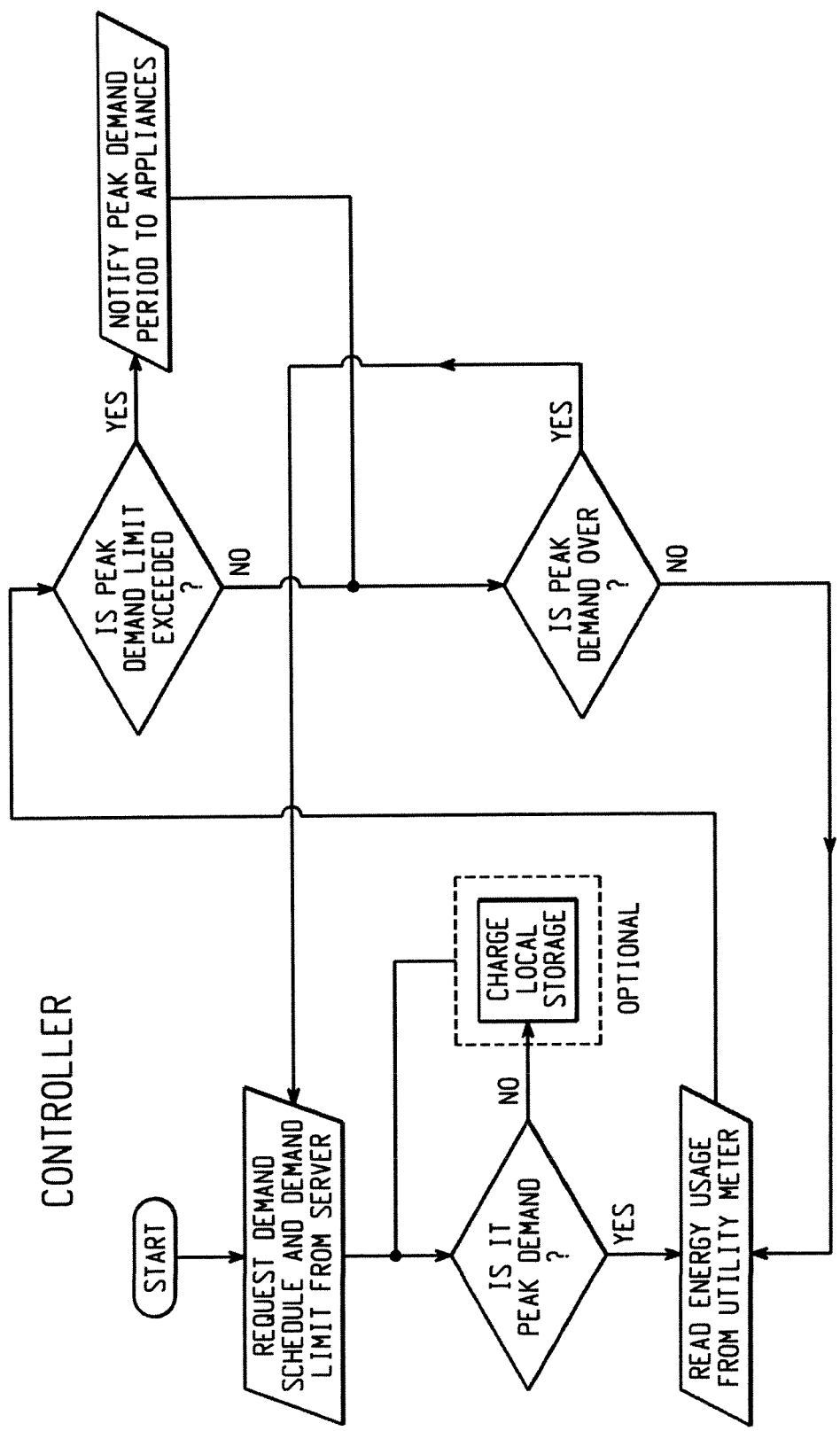

In one embodiment, a more advanced system is provided to handle energy management between the utility and the homeowner's appliances. The system can include one or more of the following: a controller, utility meter, communication network, intelligent appliances, local storage, local generator and/or demand server. Less advanced systems may actually allow the appliance to "communicate directly with the utility meter or mesh network through the DSSM (Demand Side Management Module) (FIG. 1). The demand server is a computer system that notifies the controller when the utility is in peak demand and what is the utility's current demand limit. A utility meter can also provide the controller the occurrence of peak demand and demand limit. The demand limit can also be set by the home owner. Additionally, the homeowner can choose to force various modes in the appliance control based on the rate the utility is charging at different times of the day. The controller will look at the energy consumption currently used by the home via the utility meter and see if the home is exceeding the demand limit read from the server. If the demand limit is exceeded, the controller will notify the intelligent appliances, lighting and thermostat/HVAC (FIG. 2).

Figure 3:
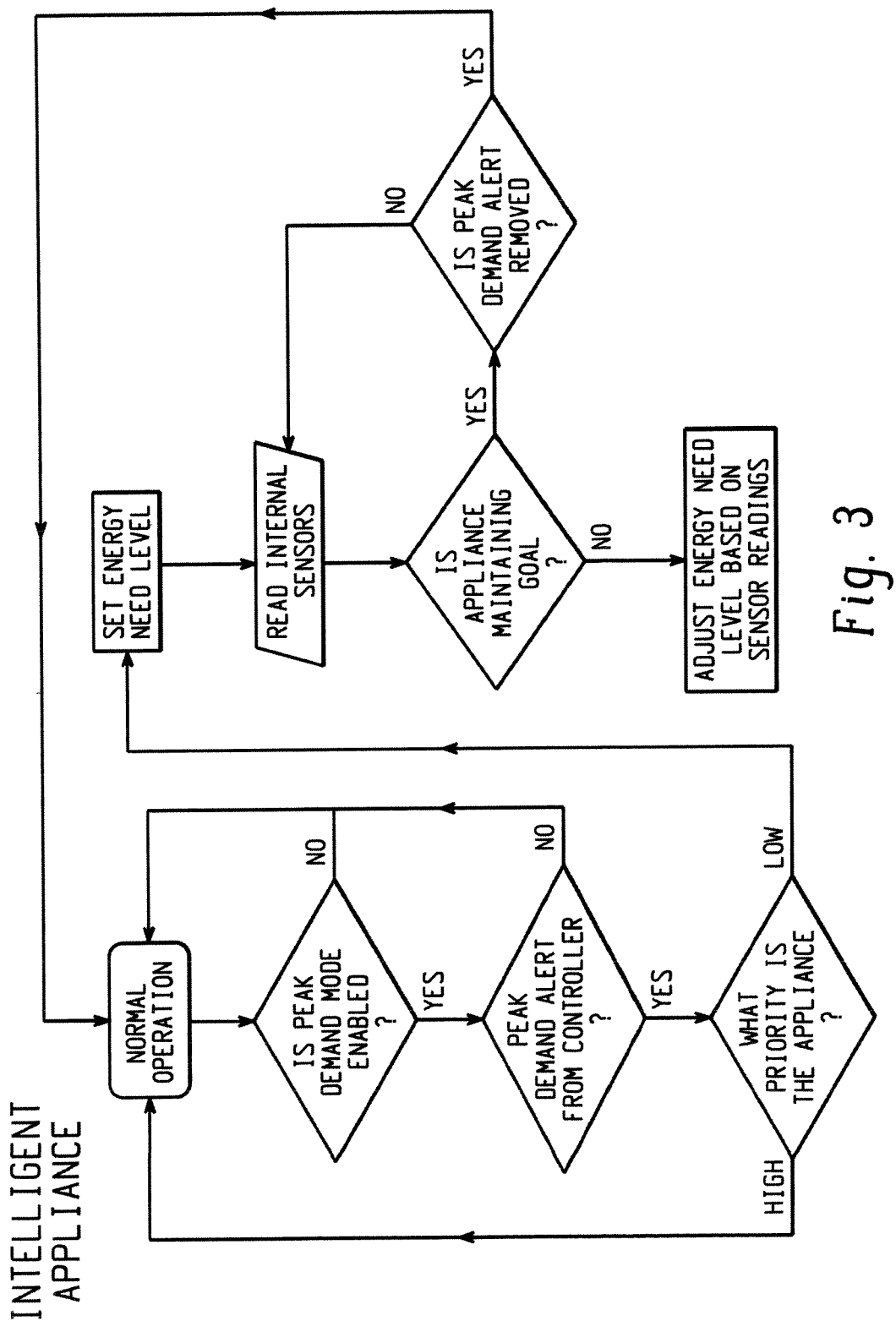

Each intelligent appliance has a communication interface that links itself to the controller (FIG. 3). This interface can be power-line carrier, wireless, and/or wired. The controller will interact with the appliance and lighting controls as well as thermostat (for HVAC) to execute the users preferences/settings.

Enabled appliances receive signals from the utility meter and help lower the peak load on the utility and lower the amount of energy that the consumer uses during high energy cost periods of the day. There are several ways to accomplish this, through wireless communication (ZigBee, WiFi, etc) or through PLC (power line carrier) communication. Alternatively, using passive RFID tags that resonate at different frequencies resonated by the master, or one or more active RFID tags that can store data that can be manipulated by the master device and read by the slave devices(s) is an effective and potentially lower cost communication solution since there is no protocol. Rather, a pulse of energy at a particular frequency will allow a low cost method with an open protocol for transmitting/communicating between a master device and one or more slave devices, and appropriate functions/actions can be taken based upon these signals.

Figure 4:
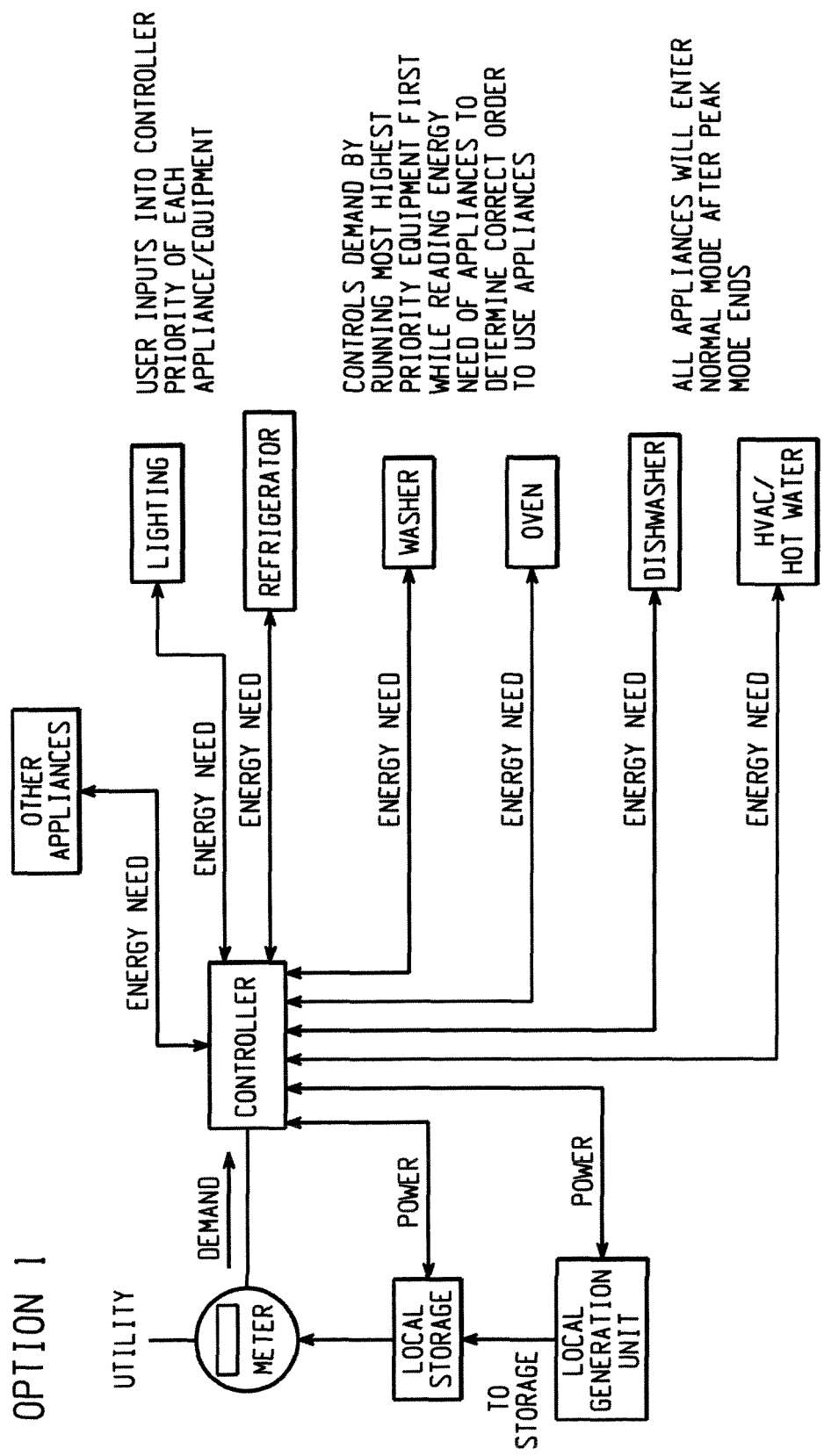

The interaction between controller and appliances can occur in two ways. For example, in one scenario during a peak demand period, the controller will receive a demand limit from the utility, demand server or user. The controller will then allocate the home's demand based on two factors: priority of the appliance and energy need level (FIG. 4). The priority dictates which appliances have higher priority to be in full or partial energy mode than other appliances. Energy need dictates how much energy is required for a certain time period in order for that appliance to function properly. If the appliance's energy need is too low to function properly, the appliance moves to a normal mode or a higher energy need level. The energy saving mode is typically a lower energy usage mode for the appliance such as shutdowns of compressors and motors, delayed cycles, higher operating temperatures in summer or lower operating temperatures in winter until the peak demand period is over. Once the demand limit is reached, the appliances will stay in their energy mode until peak demand is over, or a user overrides, or appliance finishes need cycle or priority changes. The controller constantly receives status updates from the appliances in order to determine which state they are in and in order to determine if priorities need to change to accomplish the system goals.

Figure 5:
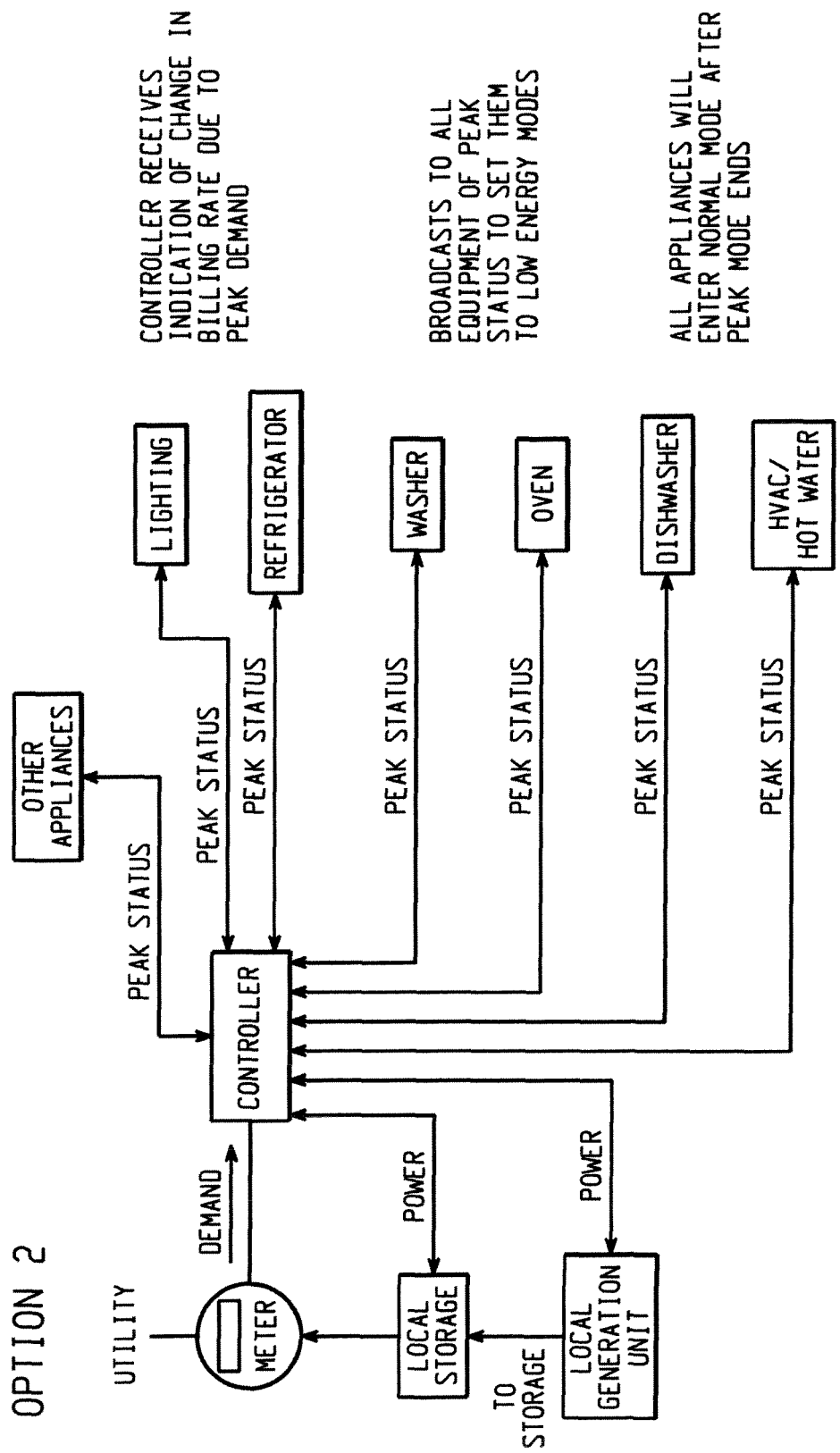

In a second scenario, for example, a set point is provided. During a peak demand period, the controller will tell each appliance to go into peak demand mode (FIG. 5). The appliance will then go into a lower energy mode. The customer can deactivate the energy savings mode by selecting a feature on the appliance front end controls (i.e. user interface board) before or during the appliance use or at the controller. The controller can also communicate to a local storage or power generation unit. This local unit is connected to the incoming power supply from the utility. The controller notifies the storage unit to charge when it is not in peak demand, if a storage unit is included and available. If the storage unit has enough energy to supply the appliances during peak demand, then the controller will switch the home's energy consumption from the utility to the storage unit. The unit can also be local generator/storage such as solar, hydrogen fuel cell, etc.

Figure 6:
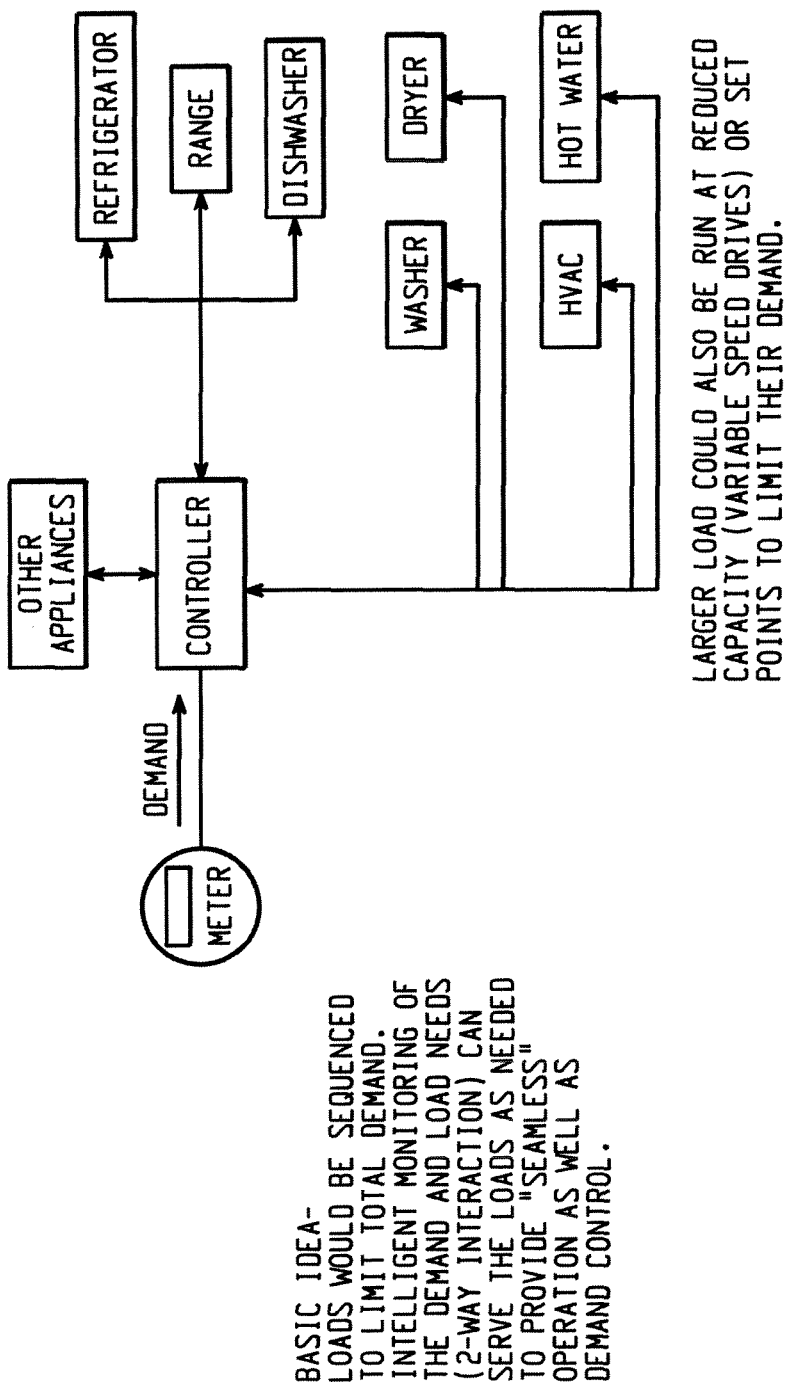
Figure 7:
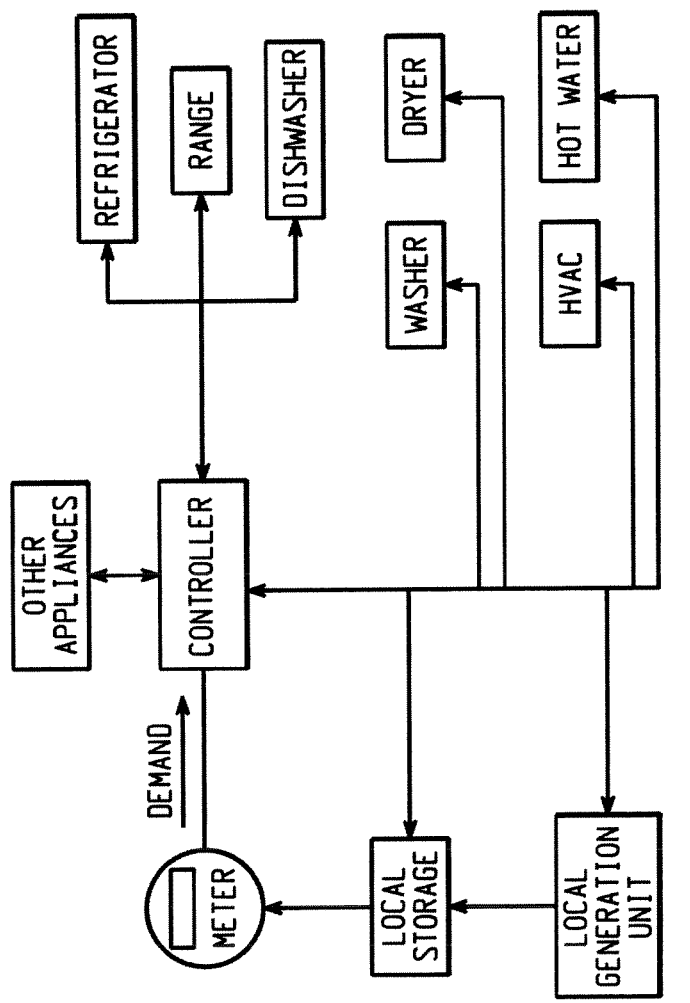
Figure 8:
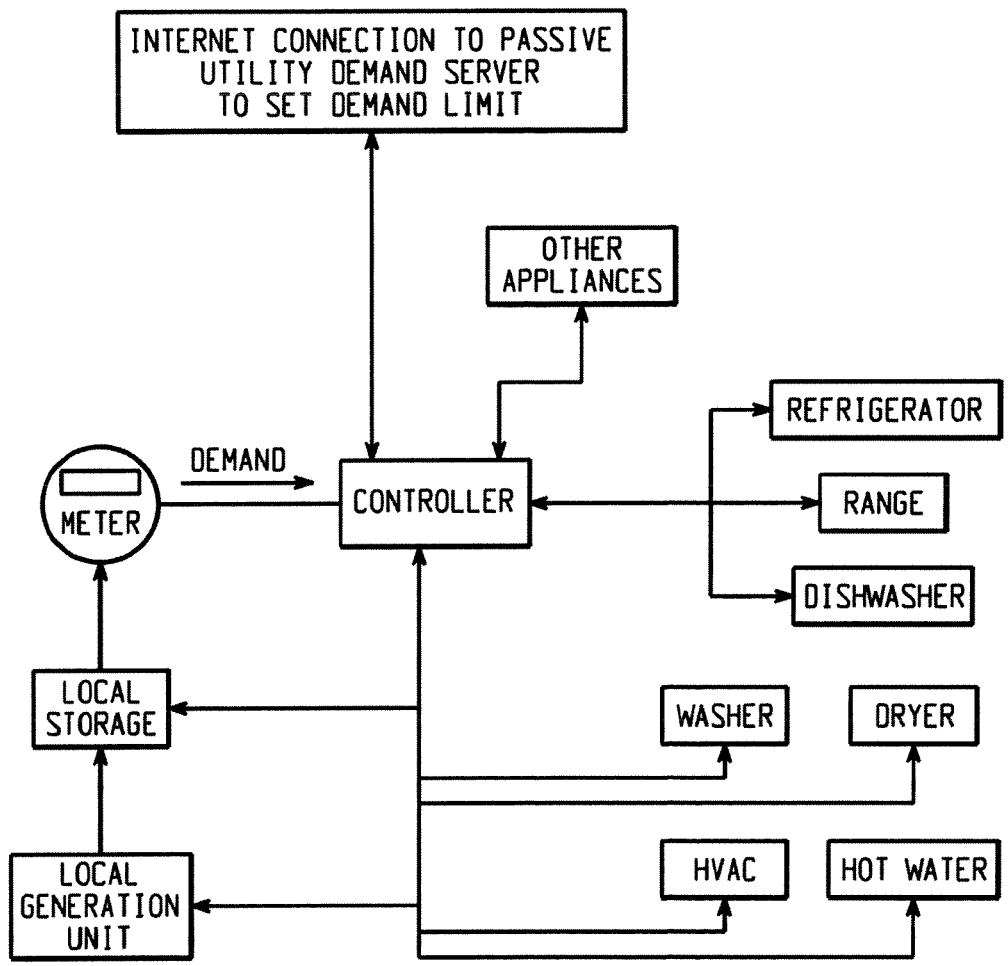
Figure 14:
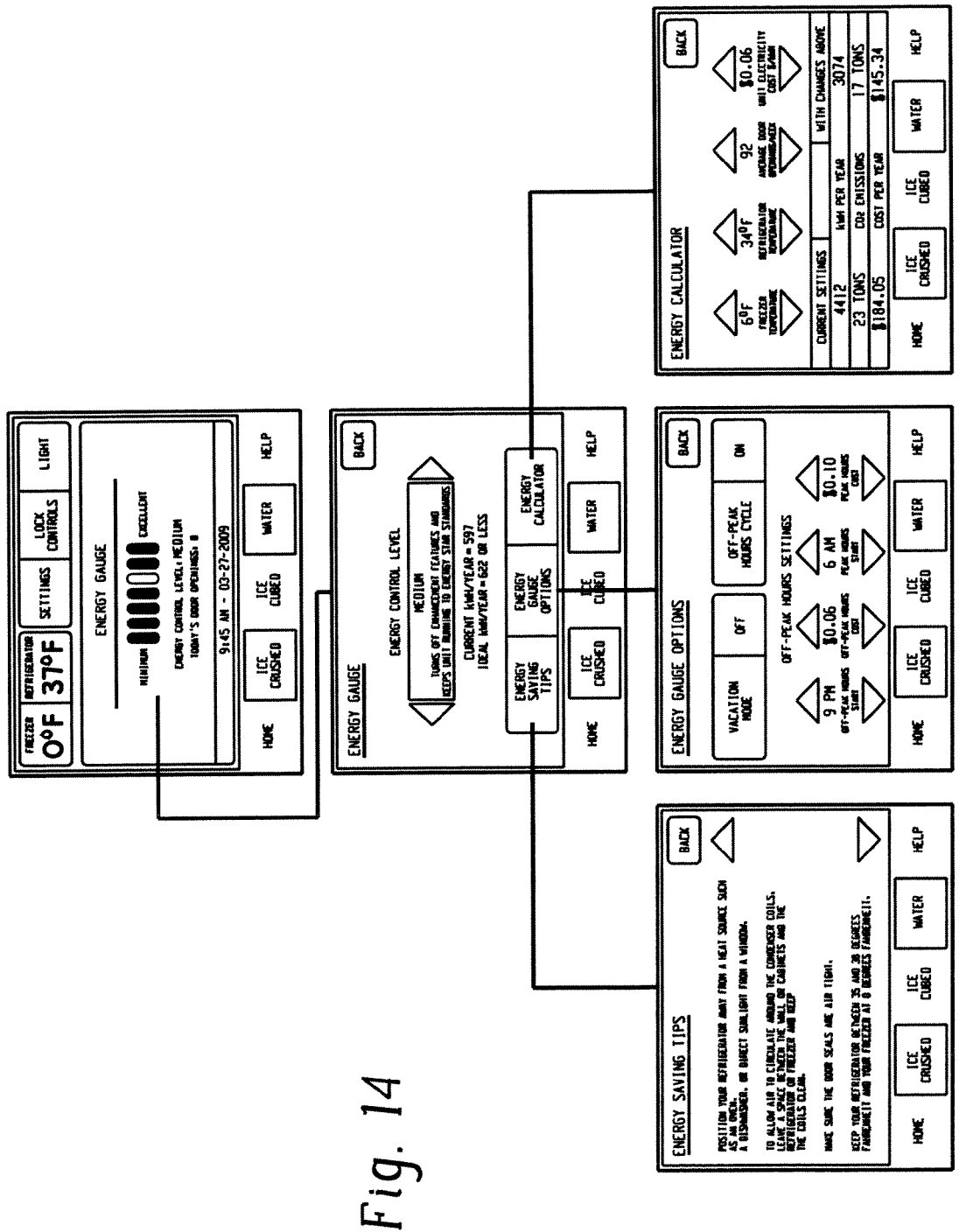
Figure 15:
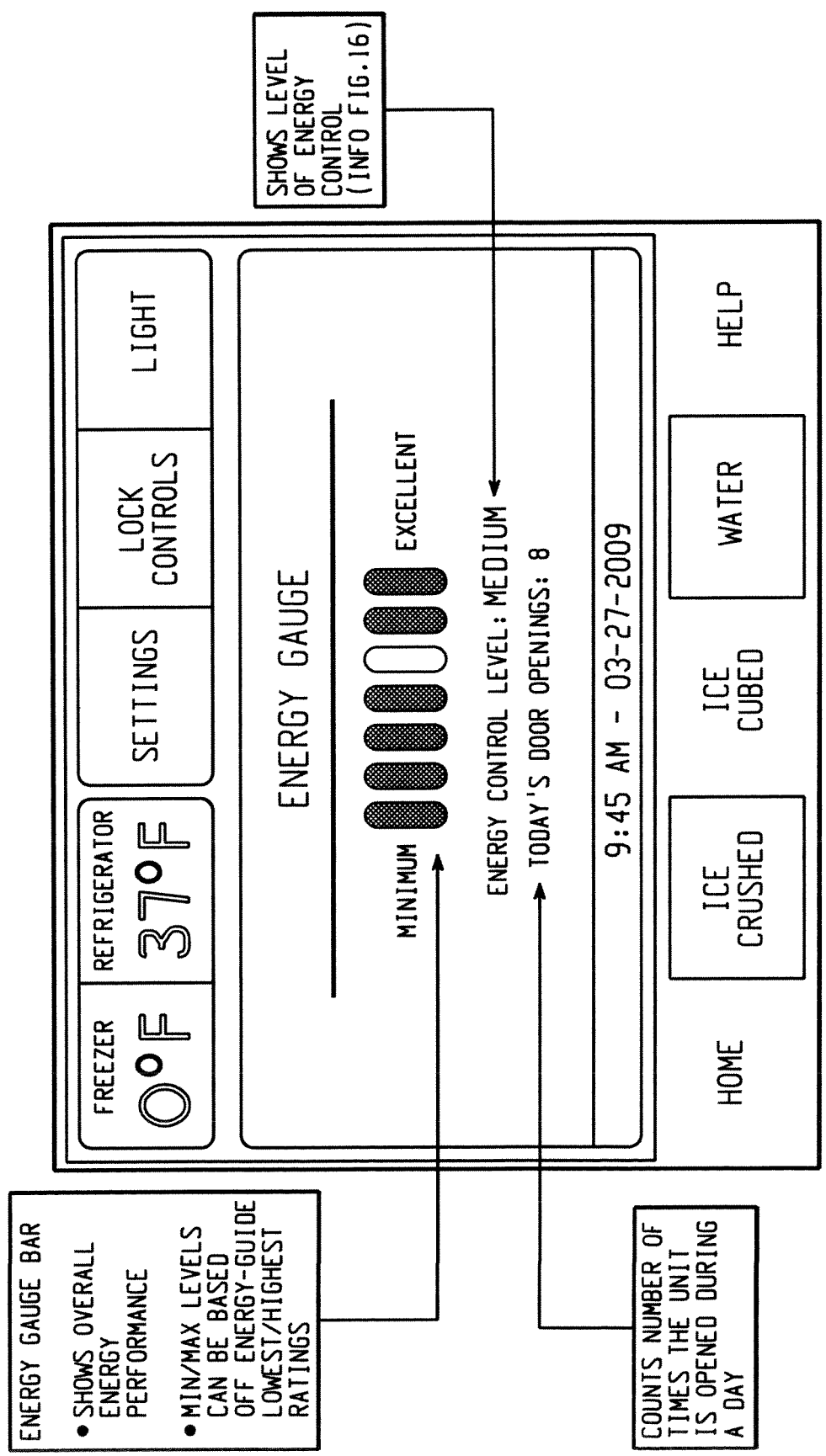
Figure 16:
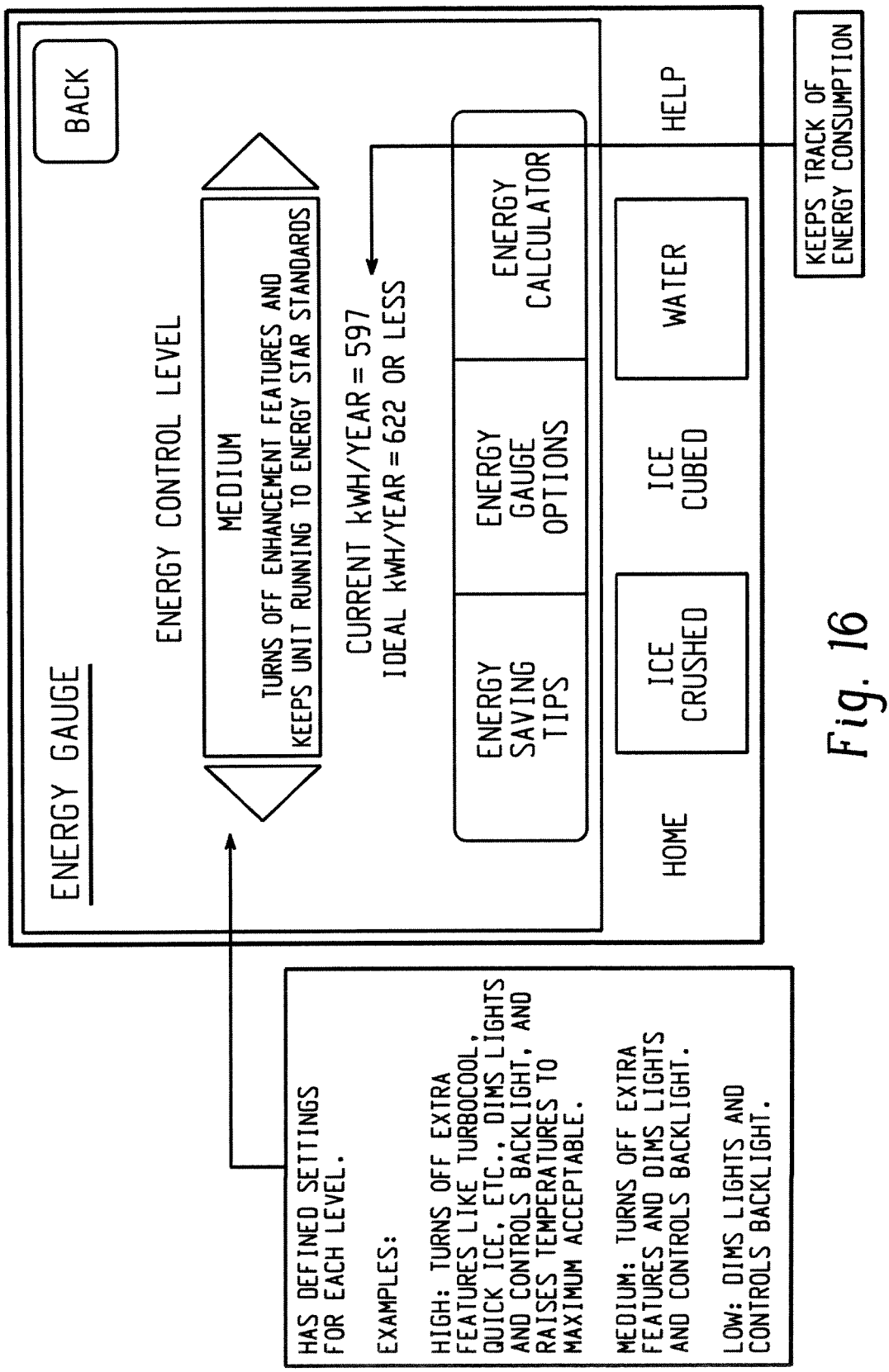
Figure 17:
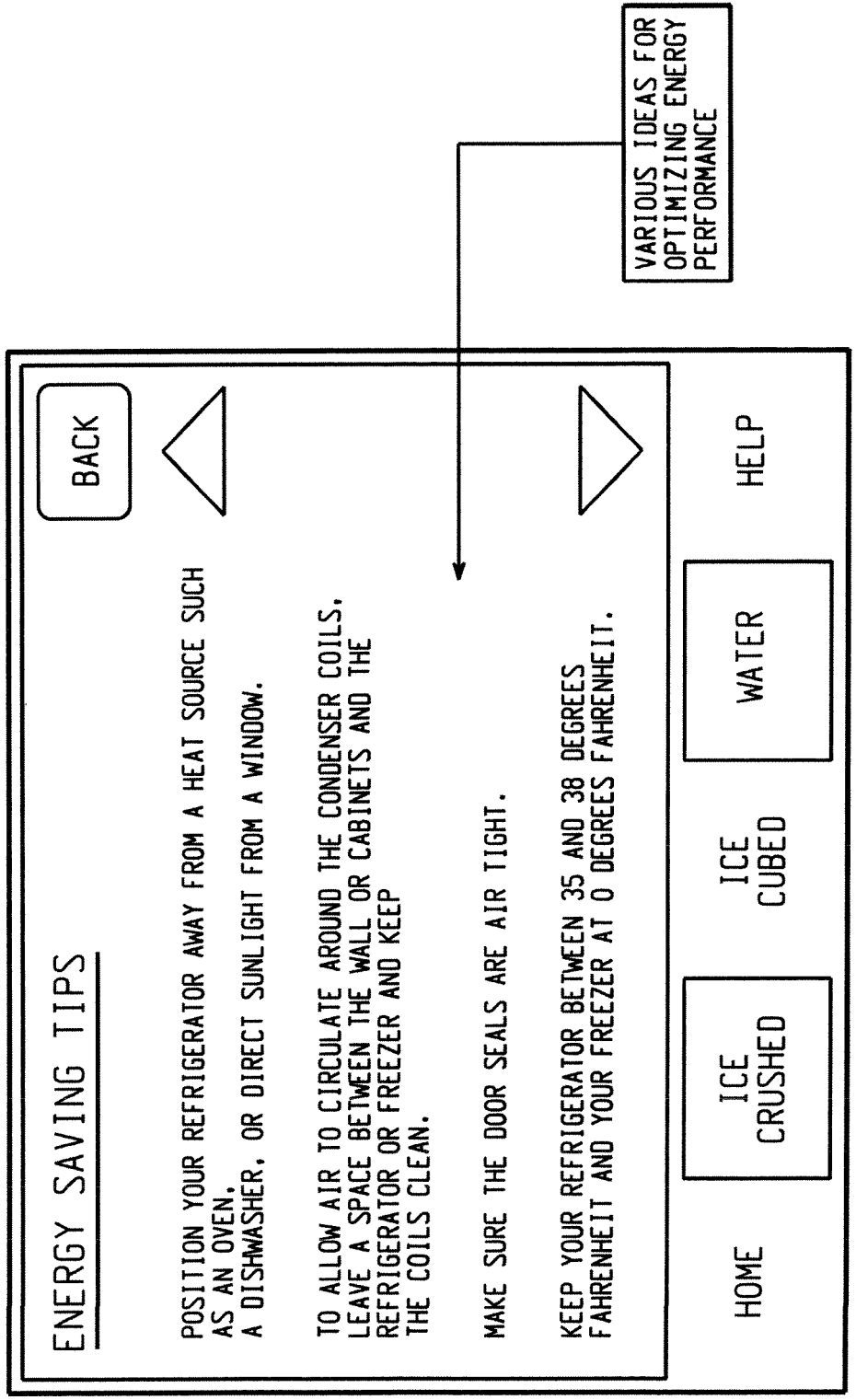
Figure 18:
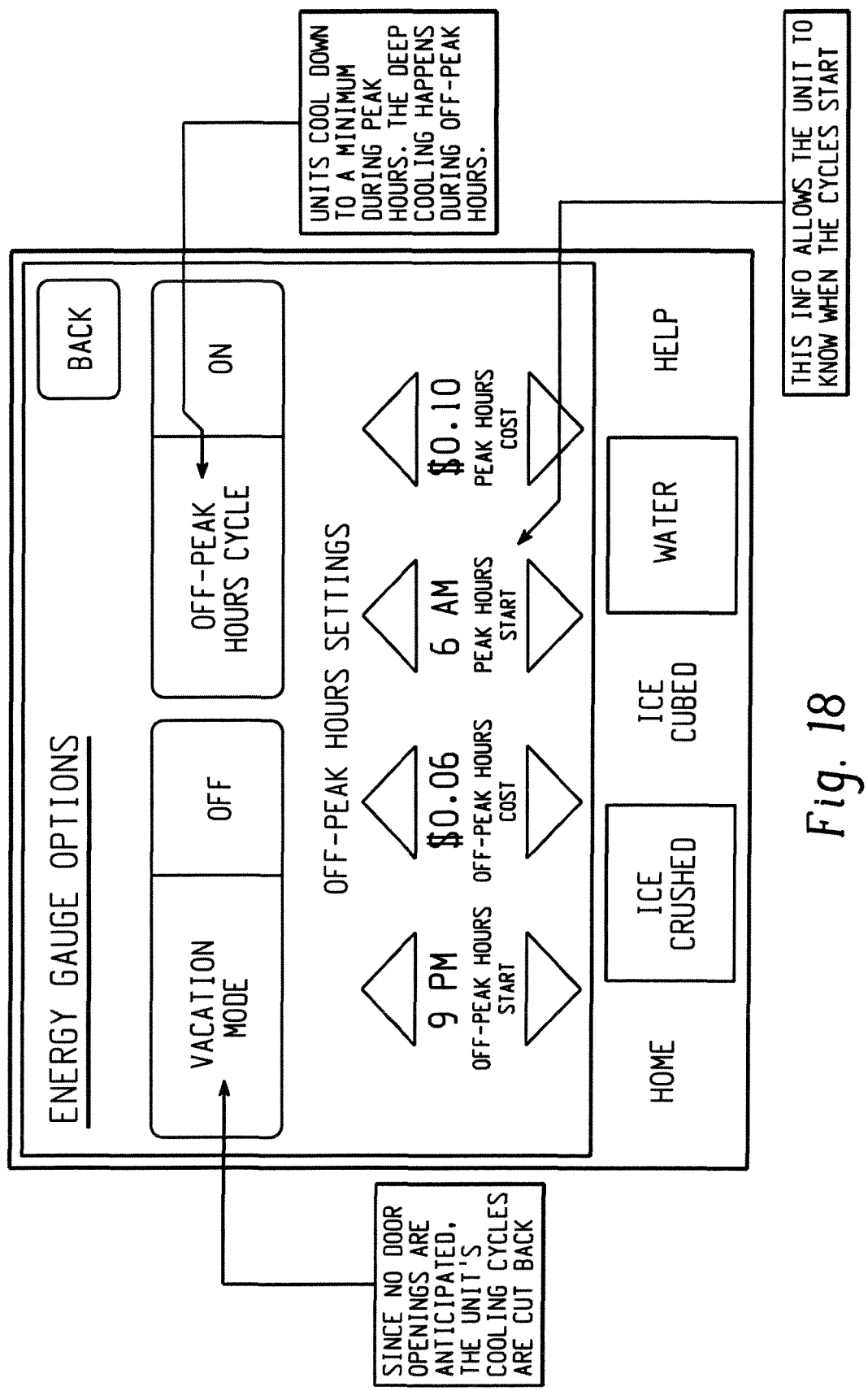

The central controller handles energy management between the utility and home appliances, lighting, thermostat/HVAC, etc. with customer choices incorporated in the decision making process. The controller may include notification of an energy saving mode based on demand limit read from one or more of a utility meter, utility, demand server or user. An energy savings mode of an appliance can thereby be controlled or regulated based on priority and energy need level sent from the controller and/or the customer (FIG. 6). Likewise, consideration to use of local energy storage and use of a local generator to offset peak demand limit can be incorporated into the energy management considerations, or provide the ability to override mode of energy savings through the controller or at the appliance, lighting, or thermostat/HVAC (FIGS. 7 and 8).

The present disclosure has the ability for the home to shed loads in pending brown-out or black-out situations, yet have intelligence to prevent an improper action such as shutting down the refrigerator for extended timeframes that might compromise food storage safety.

How much energy the appliance consumes in peak demand is based on priority of the device and the energy need level. If the appliance's priority is high, then the appliance will most likely not go into a saving mode. The energy need level is based on how little energy the appliance can consume during peak demand and still provide the function setting it is in (i.e. in a refrigerator, ensuring that the temperature is cool enough to prevent spoiling). It will also be appreciated that an appliance may have multiple energy need levels.

The controller will be the main product with the communication and settings control incorporated within future appliances. Specific meters will be selected so that the controller can read the demand usage. It is intended that the demand server will possibly be purchased or leased to the utility.

A method is provided for constructing an appliance designed to perform any key function, the appliance comprises of several mechanical and electrical elements controlled by a main controller. This main controller has a port for receiving information regarding the operational state of the appliance. The port also has a user interface or switch which could be used to override the information received by the controller through the port. Two-way or one-way communication devices may be connected to the port. These communication devices will receive signals from a remote controller, process those signals and as a result communicate an operational state to the main controller of the appliance. This operational state is communicated to the main controller by one or more remote controllers in a specific format determined by the appliance. These signals from the remote controller(s) could be based on a variety of communication methods and associated protocols. On receiving the operational state signal, the appliance main controller causes the appliance to run a predetermined operational mode. These operational modes are designed into the appliance(s) and result in different resource consumption levels or patterns, even delaying use. Resources could include energy, water, air, heat, sunlight, time, etc. In future appliance models, the consumer might be given the authority to modify the appliance responses to a given rate signal. The consumer would be presented a "check box" of potential response modes and allowed to choose within set parameters. For instance, the consumer might be allowed to choose the amount of temperature adjustment a refrigerator will make in response to a high utility rate.

A method of communicating data between a master device and one or more slave devices may advantageously use continuous tone-coded transmission system. This can be a number of states or signals, either using one or more continuous tones that signify different rate states coming from the home area network (from meter) or the utility. Additionally, one could send a combination of tones to transmit binary messages using a few tones. The slave devices will incorporate a receiver that receives the carrier frequency and then decodes the continuous tone which corresponds to the particular state of the utility rate. Once the "receiver board" detects the tone, then the downstream circuitry will trigger the appropriate response in the appliance. The carrier frequency in this scheme can be numerous spectrums, one being the FM broadcast band or a specific FM band allocated by the FCC for low level power output. The advantage of broadcast band FM is the low cost of such devices and the potential to penetrate walls, etc. within a home with very low levels of power due to the long wavelength of the 89-106 Mhz carrier. This process is used today in 2-way radio communications to reduce the annoyance of listening to multiple users on shared 2-way radio frequencies. The process in these radios is referred to as CTCSS (continuous tone-coded squelch system) and would find application in this end use.

Generally, it is not known to have modular interfaces that can receive signals from a control source. Also, no prior arrangements have functioned by addressing the control board of the appliance with a signal that directs the appliance to respond.

Thus, by way of example only, the structure and/or operation of a refrigerator (FIG. 9, although other appliances are also represented) may be modified or altered by reducing the temperature, especially in the freezer compartment pre on-peak time and further temporarily provide a compartment temperature increase to shave on-peak load. Specifically, defrost operation could be delayed until off-peak time. Alternatively or conjunctively, the freezer and refrigerator temperature setpoints may be set to maintain less compressor on time during on-peak demand times. Similarly, the refrigerator/freezer could be programmed so that lights will not be permitted to come on or the lights must be dimmed lights during on-peak demand times. During on-peak demand times, the fan operating speeds can be reduced, and/or compressor operating speed reduced in order to reduce energy consumption. Still another option is to reduce the delay time for the door alarm to sound during on-peak time. Other power load reducing measures in a refrigerator may include (reducing before on-peak hours) the temperature of the freezer and refrigerator compartments in a refrigerator (prechill) and slightly increase temperature setting during on-peak rates. For example, just before peak rate time, the temperature setting could be decreased by 1-2 degrees (during off-peak rates). Some communication line with the electrical company could be established. Thus, the electrical company may be able to send a signal in advance to prechill the refrigerator (or in the case of an air conditioner, decrease the room temperature during off-peak rates as a pre-chill maneuver) and, in turn, increase the temperature setting during on-peak rates.

Still other energy consuming practices of the exemplary refrigerator that may be altered include turning the ice-maker off during on-peak demand times, or disabling the crushed ice mode during on-peak demand times. Alternatively, the consumer may be given the ability to select via a user interface which items are incorporated into the on-peak demand via an enable/disable menu, or to provide input selection such as entry of a zip code (FIG. 10) in order to select the utility company and time of use schedule (FIG. 11), or using a time versus day of the week schedule input method (FIGS. 12-13).

The user interface may also incorporate suggested energy saving tips or show energy usage, or provide an indicator during on-peak mode, or provide a counter to illustrate the energy impact of door opening, or showing an energy calculator to the consumer to serve as a reminder of the impact of certain selections/actions on energy use or energy conservation (FIGS. 14-19).

One path that is being pursued from the appliance perspective is to allow the onboard CPU (microprocessor) of the appliance to determine how to respond to an incoming signal asking for a load shedding response. For example, the CPU will turn on, turn off, throttle, delay, adjust, or modify specific functions and features in the appliance to provide a turndown in power consumption (FIG. 20). FIG. 21 defines specifically exemplary modes of what are possible. The main feature here is the enabling of the main board microprocessor or CPU to execute actions in the appliance to deliver load shedding (lowering power consumption at that instant). The actions available in each appliance are only limited to the devices that the CPU has control over, which are nearly all of the electrical consuming devices in an appliance. This may work better where the appliance has an electronic control versus an electromechanical control.

Of course, the above description focuses on the refrigerator but these concepts are equally applicable to other home appliances such as dishwashers, water heaters, washing machines, clothes dryers, televisions (activate a recording feature rather than turning on the television), etc., and the list is simply representative and not intended to be all encompassing.

Likewise, although these concepts have been described with respect to appliances, they may find application in areas other than appliances and other than electricity usage. For example, a controller that acts as an intermediary between the utilities meter and the appliance interprets the utility signal, processes it and then submits this signal to the appliance for the prescribed reaction. In a similar fashion, the controller may find application to other household utilities, for example, natural gas and water within the home. One can equip the water and gas meters to measure flow rates and then drive responses to a gas water heater or gas furnace precisely like the electrical case. This would assume that one might experience variable gas and water rates in the future. Secondly, the flow meters being connected to the controller could provide a consumer with a warning as to broken or leaking water lines by comparing the flow rate when a given appliance or appliances are on to the normal consumption. In cases where safety is a concern, the system could stop the flow of gas or water based on the data analysis.

Another feature might be the incorporation of "remote subscription" for the utility benefit. In some cases, the utility will be providing customers discounts/rebates for subscribing to DSM in their appliances, hot water heaters, etc. The "remote subscription" feature would allow the utility to send a signal that would "lockout" the consumer from disabling the feature since they were on the "rebate" program.

Another feature that the controller lends itself to is the inclusion of "Remote diagnostics". This feature would allow the appliance to send a signal or message to the controller indicating that something in the appliance was not up to specifications. The controller could then relay this signal to the utility or to the appliance manufacturer via the various communication avenues included into the controller (i.e., WIFI, WIMAX, Broadband, cell phone, or any other formats that the controller could "speak").

In the case of a remote subscription, the utilities today rely on the honesty of their subscribers to leave the DSM system functional. Some people may receive the discounts/rebate and then disable the feature that drives the load shedding. With this system, the utility can ensure that the feature will be enabled and provide the proper load shedding.

Figure 22:
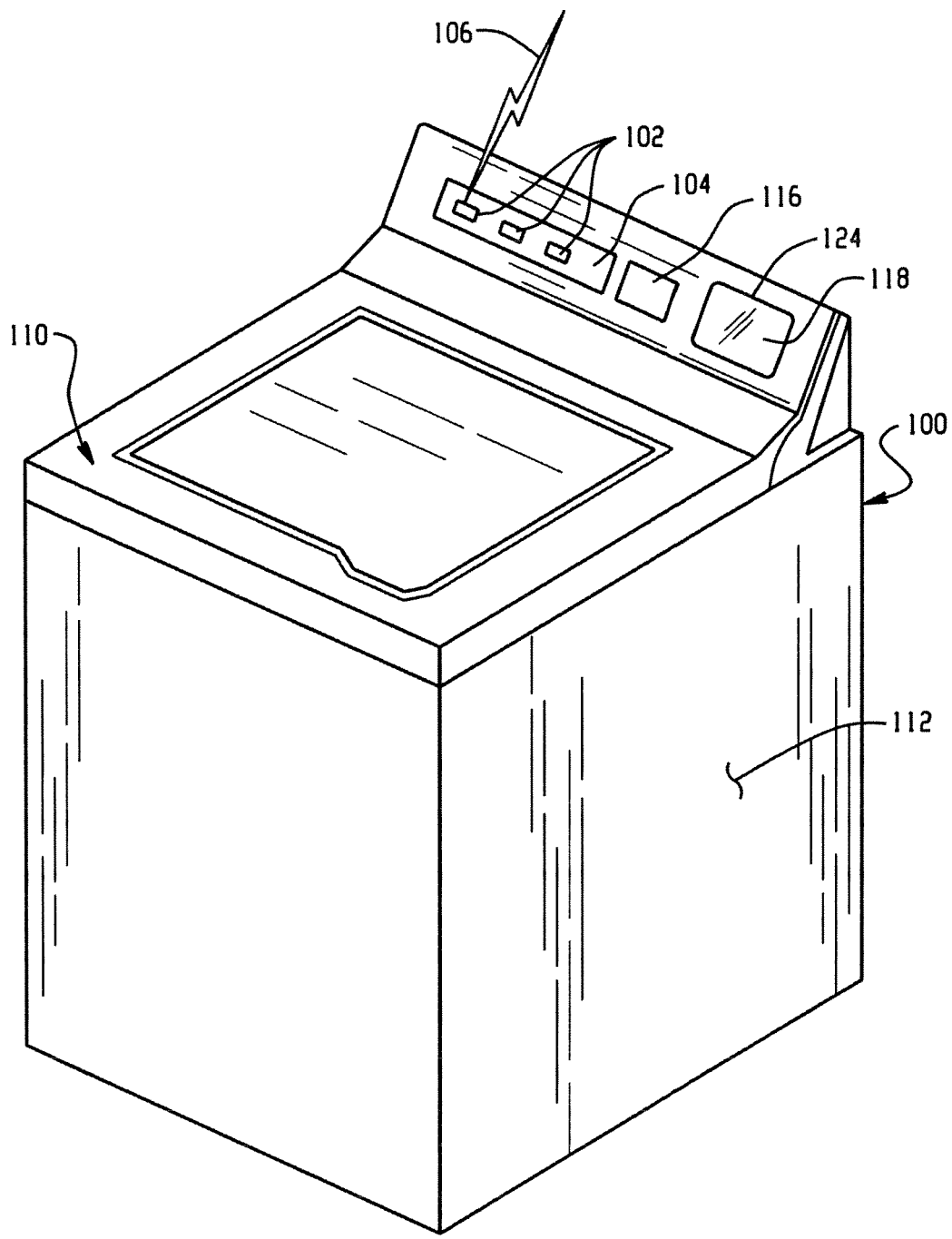
FIG. 22 is a schematic illustration of an exemplary demand managed clothes washer.

An exemplary embodiment of a demand managed appliance 100 is clothes washer 110 schematically illustrated in FIG. 22. The clothes washer 110 comprises at least one power consuming feature/function 102 and a controller 104 operatively associated with the power consuming feature/function. The controller 104 can include a micro computer on a printed circuit board which is programmed to selectively control the energization of the power consuming feature/function. The controller 104 is configured to receive and process a signal 106 indicative of a utility state, for example, availability and/or current cost of supplied energy. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 104 can operate the clothes washer 110 in one of a plurality of operating modes, including a normal operating mode and an energy savings mode, in response to the received signal. Specifically, the clothes washer 110 can be operated in the normal mode in response to a signal indicating an off-peak demand state or period and can be operated in an energy savings mode in response to a signal indicating a peak demand state or period. As will be discussed in greater detail below, the controller 104 is configured to at least selectively adjust and/or disable the power consuming feature/function to reduce power consumption of the clothes washer 110 in the energy savings mode.

The clothes washer 110 generally includes an outer case 112 and a control panel o The clothes washer further includes a lid pivotally mounted in the top wall. Though not shown in the drawings, clothes washer 110 includes within outer case 112, a tub for containing washing and rinsing liquid, a perforated wash basket disposed within the tub for receiving clothes items to be washed, an agitator within the basket for agitating the wash load a drive system comprising a drive motor for oscillating the agitator during wash and rinse cycles and spinning the basket during spin cycles and a liquid distribution system comprising a pump, for delivering water to the tub and basket and for removing liquid from the tub, all of which may be of conventional design. Controller 104 is configured with a plurality of clothes washing algorithms preprogrammed in the memory to implement user selectable cycles for washing a variety of types and sizes of clothes loads. Each such cycle comprises a combination of pre-wash wash, rinse and spin sub-cycles. Each sub-cycle is a power consuming feature/function involving energization of a motor or other power consuming component. The amount of energy consumed by each cycle depends on the nature, number and duration of each of the sub-cycles comprising the cycle. The control panel 116 can include a display 118 and control buttons for enabling the user to make various operational selections. Instructions and selections are displayed on the display 118. A light source 124 is provided for illuminating the user interface 116. r user interface 116. The clothes washer further includes a door mounted within a door frame. The control panel 116 can include a display 118 and control buttons for making various operational selections. Clothes washing algorithms can be preprogrammed in the memory for many different types of cycles. Instructions and selections are displayed on the display 118. A light source 124 is provided for illuminating the user interface 116.

As described above, appliances can be delayed in their operation, rescheduled for a later start time, and/or altered in their functioning/features in order to reduce energy demands. Some appliances lend themselves to an altered operational schedule to off-peak demand periods due to their functionality. For example, dishwashers, clothes washers, and clothes dryers all have the capacity to run at off-peak hours because demand on these appliances is either not constant and/or the functions of these appliances are such that immediate response is not necessary. As one illustrative example, a clothes washer that has been loaded during the daytime, i.e., on-peak demand period hours, can be programmed to start its operations for a later, albeit off-peak demand hours. It is to be appreciated that on-peak and off-peak demand hours can correspond to high utility costs and relatively low utility costs ($/kilowatt), respectively. In this manner, clothes can be cleaned using energy during the off-peak demand period wherein the subsequently cleaned clothes become available either later in the present day or at a time the following day. As most users can appreciate, particularly for household consumers, immediate cleaning of clothes is many times not necessary.

In order to reduce the peak energy consumed by a clothes washer, modifications and/or delays of individual clothes washer cycles can be adjusted in order to reduce the total energy consumed. Reducing total energy consumed also encompasses reducing the energy consumed at peak times and/or reducing the overall electricity demands during peak times and non-peak times. Electricity demand can be defined as average watts over a short period of time, typically 5-60 minutes Changes or adjustments to the clothes washer's scheduled time for which cycles begin can be varied in a number of ways. Delaying or modifying the clothes washer's cycle schedule can be in response to a signal from the controller 104 for the appliance to conserve energy or can be at the user's/consumer's commands. The appliance controller 104 can be in communication with an associated utility where the controller 104 receives and processes a signal from the associated utility indicative of current costs of supplying energy. The appliance controller 104 can be in communication with another appliance, 'master' appliance, or 'master' controller that is in communication with an associated utility. The controller 104 can then operate the clothes washer in one of a normal operating mode and an energy savings mode based on the received signal. The controller 104 can be configured to change the power consuming functions by adjusting one or more of an operation schedule, an operation delay, an operation adjustment, and a selective deactivation of at least one of the one or more power consuming functions to reduce power consumption of the clothes washer in the energy savings mode. In order to reduce the peak energy consumed by the clothes washer 110, the controller 104 is configured to selectively adjust and/or disable at least one of the one or more power consuming features/functions to reduce power consumption of the clothes washer 110 in the energy savings mode. To this extent, the controller 104 is configured to reduce power levels in the energy savings mode. The controller 104 is also configured to reduce functions and/or reduce the intensity of functions in the energy savings mode.

It is to be appreciated that energy savings mode can be accomplished by adjusting operation functions/features during on peak demand periods, delaying or rescheduling operations to an off peak demand period, and through a combination of both adjustment of operations and rescheduling to off peak demands. Off peak demand periods correspond to periods during which lower cost energy is being supplied by the utility relative to peak demand periods during identifiable periods.

Changing the start of an appliance operation can be through a delay in start time or a rescheduling to a particular time period. Operational delays include one or more of a delay in start time, an extension of time to the delayed start, stopping an existing cycle and delaying a restart, finishing an existing cycle and delaying a restart (or start of subsequent cycle), and stopping, after more than one cycle and delaying a restart. The stopping after more than one cycle can comprise advancing through one or more cycles until a logical stop is reached and then delaying any further operations until off-peak mode hours. The logical stop can include before a main wash, before a rinse phase, and/or before a spin cycle. In this manner, operations can either be delayed before they are initiated and/or they can be stopped after they have been initiated and restarted at a later time. For some functions, i.e., a wash cycle, it may be advantageous to finish an existing wash cycle and delaying a start of any subsequent cycles to an off peak demand period. In still other circumstances, a wash cycle followed by a rinse cycle may be advantageously programmed for completion and then the subsequent spinning cycle delayed for an off peak demand period. In this manner, the clothes washer's cycles effectively operate "normally" but can be delayed wherein one or more of the cycles are stopped/delayed and restarted/started during a non-peak demand period.

Alternatively, or in conjunction with the above operational delays, an operational schedule can be initiated wherein a user interface gives a user the ability to select which of the one or more clothes washer functions are to be scheduled by the clothes washer control system at non-peak mode hours. Additionally, the clothes washer control system can receive a zip code entry which corresponds to a time of use schedule of a utility company from which the clothes washer control system can determine on-peak mode hours and off-peak mode hours. The information can use a time versus day of the week schedule input method that receives a cost, or price, per i.e. kilowatt hour signal directly from the utility advising of the current costs and schedules activation of the clothes washer to off-peak mode hours.

A control method in accordance with the present disclosure comprises determining a cost of supplying energy from the associated utility, the cost being indicative of a peak demand period or an off-peak demand period, operating the clothes washer in a normal mode during the off-peak demand period, operating the clothes washer in an energy savings mode during the peak (or off-peak) demand period, scheduling, delaying, adjusting and/or selectively deactivating any number of one or more power consuming features/functions of the clothes washer to reduce power consumption of the clothes washer in the energy savings mode, and returning to the normal mode after the peak demand period is over. Off peak demand periods correspond to periods during which lower cost energy is being supplied by the utility relative to peak demand periods.

In conjunction with the scheduling delays described above, or as separate operational changes, the following operation adjustments can be selected in order to reduce energy demands. The operation adjustments to be described hereinafter, can be implemented in conjunction with off-peak mode hours and/or can be implemented during on-peak mode hours. Associated with a clothes washer, the operational adjustments can include one or more of the following: a reduction in operating temperature (i.e. temperature set point adjustments) in one or more cycles, a disablement of one or more heaters in one or more cycles, reduction in power to one or more heaters, a switch from a selected cycle to a reduced power consumption cycle, a reduction in a duration of cycle time in one or more cycles, a disablement of one or more cycles, a skipping of one or more cycles, a reduction of water volume and/or water temperature in one or more cycles, and an adjustment to the wash additives (i.e., detergent, fabric softener, bleach, etc.) in one or more cycles. Illustratively, a switch from a selected cycle to a reduced power consumption cycle could include a change to the cycle definition when a command is received. For example, if a customer/user pushes "heavy duty wash" cycle, the selected cycle would then switch to a "regular" cycle, or the customer/user pushes "normal" cycle which would then switch to a "permanent press" cycle. As described, the switching is in response to lowering the energy demands from a selected cycle to a reduced power consumption cycle that meets a similar functional cycle.

Figure 23:
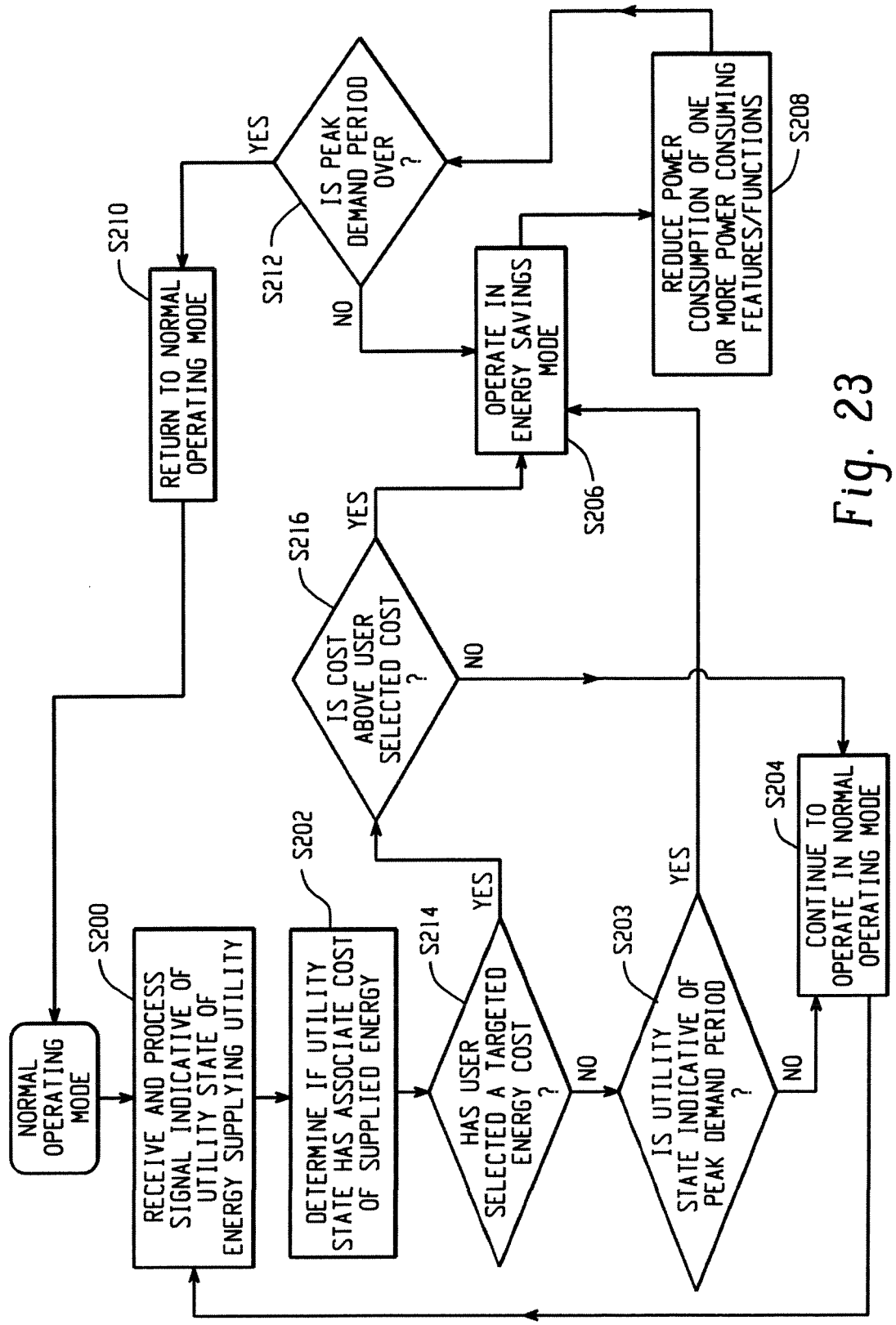
FIG. 23 is an exemplary operational flow chart for the clothes washer of FIG. 22.

With reference to FIG. 23, a control method in accordance with the present disclosure comprises communicating with an associated utility and receiving and processing the signal indicative of cost of supplied energy (S200), determining a state for an associated energy supplying utility, such as a cost of supplying energy from the associated utility (S202), the utility state being indicative of at least a peak demand period or an off-peak demand period (S203), operating the clothes washer 110 in a normal mode during the off-peak demand period (S204), operating the clothes washer 110 in an energy savings mode during the peak demand period (S206), selectively adjusting any number of one or more power consuming features/functions of the clothes washer to reduce power consumption of the appliance in the energy savings mode (S208), and returning to the normal mode (S210) after the peak demand period is over (S212). The selective adjustment can include reducing power in the energy savings mode, for example, selecting one or more of the operational adjustments described above.

It is to be appreciated that a selectable override option can be provided on the user interface 116 providing a user the ability to select which of the one or more power consuming features/functions are adjusted by the controller in the energy savings mode. The user can override any adjustments, whether time related or function related, to any of the power consuming functions. The override option can be initiated at any time or can be initiated based on a certain $/kilowatt hour. For the method outlined in FIG. 23, if the utility state has an associated energy cost, the user can select a targeted energy cost (S214) and can base operation of the appliance on the selected targeted, energy cost. If the current cost of energy is above the user selected cost (S216), then energy savings mode (S206) is initiated. If the current cost of energy is below the user selected cost, then the appliance continues to operate in normal mode (S204). The operational adjustments, particularly an energy savings operation can be accompanied by a display on the panel which communicates activation of the energy savings mode. The energy savings mode display can include a display of "ECO", "Eco", "EP", "ER", "CP", "CPP", "DR", or "PP" on the appliance display panel 118 in cases where the display is limited to three characters. In cases with displays having additional characters available, messaging can be enhanced accordingly. Additionally, an audible signal can be provided to alert the user of the appliance operating in the energy savings mode The duration of time that the clothes washer 110 operates in the energy savings mode may be determined by information in the energy signal 106. For example, the energy signal 106 may inform the clothes washer 110 to operate in the energy savings mode for a few minutes or for one hour, at which time the appliance returns to normal operation. Alternatively, the energy signal 106 may be continuously transmitted by the utility provider, or other signal generating system, as long as it is determined that instantaneous load reduction is necessary. Once transmission of the signal 106 has ceased, the clothes washer 110 returns to normal operating mode. In yet another embodiment, an energy signal may be transmitted to the appliance to signal the appliance to operate in the energy savings mode. A normal operation signal may then be later transmitted to the appliance to signal the appliance to return to the normal operating mode.

Figure 24:
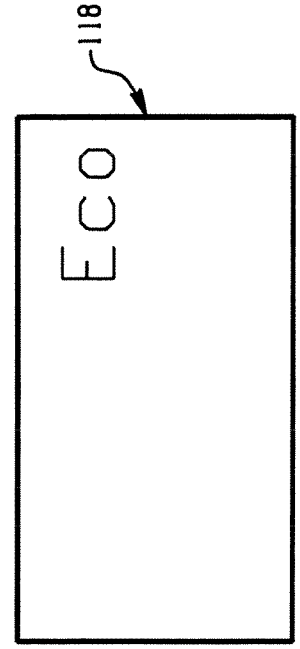
FIG. 24 is an exemplary control response for the clothes washer of FIG. 22.

The operation of the clothes washer 110 may vary as a function of a characteristic of the supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW (level 1), MEDIUM (level 2), HIGH (level 3), and CRITICAL (level 4). These tiers are shown in the chart of FIG. 24 to partially illustrate operation of the clothes washer 110 in each pricing tier. In the illustrative embodiment the appliance control response to the LOW and MEDIUM tiers is the same namely the appliance remains in the normal operating mode. Likewise the response to the HIGH and CRITICAL tiers is the same, namely operating the appliance in the energy saving mode. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff. The operational and functional adjustments described above, and others, can be initiated and/or dependent upon the tiers. For example, the clothes washer 110 hot water selection can be prevented or 'blocked' from activating if the pricing tier is at level 3 or 4. The display 118 can include an audible and visual alert of pricing tier 3 and 4. Some communication line with the utility can be established including, but not limited to, the communication arrangements hereinbefore described. In addition, the display 118 can provide the actual cost of running the appliance in the selected mode of operation, as well as, maintain a running display of the present cost of energy. If the utility offers more than two rate/cost conditions, different combinations of energy saving control steps may be programmed to provide satisfactory cost savings/performance tradeoff.

The invention has been described with reference to the preferred embodiments. Obviously, modifications and alterations will occur to others upon reading and understanding the preceding detailed description. It is intended that the invention be construed as including all such modifications and alterations.

What is claimed is:

1. A clothes washer comprising:
   one or more power consuming, functions including at least one of a tub, a drive system for driving a basket, and a water delivery system comprising a pump for delivering water to the tub; and,
   a controller in signal communication with an associated utility company, the controller configured to receive and process a signal indicative of a current state of the associated utility company, wherein the associated utility company indicated current state is at least one of a demand period status, a current energy cost, and an energy availability;
   the controller configured to operate the clothes washer in one of a plurality of operating modes, including at least a normal operating mode and an energy savings mode, in response to the received signal, the controller being; configured to change the power consuming functions by adjusting one or more of an operation schedule, an operation delay, an operation adjustment, and a selective deactivation of at least one of the one or more power consuming features/functions so that the clothes washer enters a lower energy usage mode.

2. The clothes washer according to claim 1, wherein the operation delay is selected from the group consisting of a delay in start time, an extension of time to the delay start, stopping an existing cycle and delaying a restart, finishing an existing cycle and delaying a restart, and stopping after more than one cycle and delaying a restart.

3. The clothes washer according to claim 2, wherein the stopping after more than one cycle is selected from the group consisting of stopping after a wash cycle, stopping after a rinse cycle, and stopping after a spin cycle.

4. The clothes washer according to claim 1, wherein the operation schedule comprises a user interface that gives a user the ability to select which of the one or more power consuming clothes washer functions are scheduled by the clothes washer control system, that receives a zip code entry which corresponds to a time of use schedule of the utility company from which the clothes washer control system can determine on-peak mode hours and off-peak mode hours; that uses a time versus day of the week schedule input method; that receives a rate signal directly from the utility company advising of the current rate; and schedules activation of clothes washer to off-peak mode hours.

5. The clothes washer according to claim 4, wherein the operation adjustment adjusts the clothes washer functions during off-peak mode hours.

6. The clothes washer according to claim 5, wherein the operation adjustment is selected from the group consisting of a reduction in target temperature in one or inure cycles, a disablement of one or more heaters in one or more cycles, reduction in power to one or more heaters, a switch from a selected cycle to a reduced power consumption cycle, a reduction in a duration of cycle time in one or more cycles, a disablement of one or more cycles, a skipping of one or more cycles, a reduction in water volume in one or more cycles, and an adjustment to wash additives in one or more cycles.

7. The clothes washer according to claim 1, wherein the operation adjustment comprises a user interface that gives a user the ability to select which of the one or more power consuming clothes washer functions are used by the clothes washer control system, that receives a zip code entry which corresponds to a time of use schedule of a utility company from which the clothes washer control system can determine on-peak mode hours and off-peak mode hours; that uses a time versus day of the week schedule input method; that receives a rate signal directly from the utility company advising of the current rate; and adjusts the clothes washer functions during on-peak mode hours.

8. The clothes washer according to claim 7, wherein the operation adjustment is selected from the group consisting of a reduction in target temperature in one or more cycles, a disablement of one or more heaters in one or more cycles, reduction in power to one or more heaters, a switch from a selected cycle to a reduced power consumption cycle, a reduction in a duration of cycle time in one or more cycles, a disablement of one or more cycles, a skipping of one or more cycles, a reduction in water volume in one or more cycles, and an adjustment to wash additives in one or more cycles.

9. The clothes washer according to claim 7, wherein the operation delay is selected from the group consisting of a delay in start time, an extension of time to the delay start, stopping an existing cycle and delaying a restart, finishing an existing cycle and delaying, a restart, and stopping after more than one cycle and delaying a restart.

10. The clothes washer according to claim 1, wherein the operation adjustment is selected from the group consisting of a reduction in target temperature in one or more cycles, a disablement of one or more heaters in one or more cycles, reduction in power to one or more heaters, a switch from a selected cycle to a reduced power consumption cycle, a reduction in a duration of cycle time in one or more cycles, a disablement of one or more cycles, a skipping of one or more cycles, a reduction in water volume in one or more cycles, and an adjustment to wash additives in one or more cycles.

11. The clothes washer according to claim 1, wherein the energy signal has an associated energy cost and wherein the controller is configured to override the operating mode of the clothes washing appliance based on a user selected targeted energy cost; wherein if current energy cost exceeds the user selected cost, the controller operates the appliance in the energy savings mode, and, wherein if the current energy cost is less than the user selected cost, the controller operates the appliance in the normal operating mode.

12. The clothes washer according to claim 1, further comprising a display communicating activation of the energy savings mode.

13. The clothes washer according to claim 12, wherein the energy savings mode display includes a message selected from the group consisting of "ECO", "Eco", "EP", "ER", "CP", "CPP", "DR", and "PP".

14. A clothes washer comprising:
a tub for receiving washing liquid;
a perforated basket disposed within the tub for receiving items to be washed;
a drive system for driving the basket; and,
a controller configured to control energization of the drive system to selectively implement a plurality of power consuming cycles, and to receive and process an energy signal indicative of a current state of an associated utility company, wherein the associated utility company indicated current state is at least one of a utility peak demand period, a utility off-peak demand period, a current energy cost, and an enemy availability;
the controller configured to operate the clothes washer in one of an energy savings mode and a normal operating mode based on the received signal being in the first and second states respectively, the controller being configured to at least one of selectively delay or alter one or more of the power consuming cycles so that the clothes washer enters a lower energy usage mode.

15. The clothes washer of claim 14, wherein the energy signal has an associated energy cost and further including a display communicating current cost of energy and current cost of operating the clothes washer.

* * * * *

UNITED STATES PATENT AND TRADEMARK OFFICE
CERTIFICATE OF CORRECTION

| | | |
|---|---|---|
| PATENT NO. | : 8,627,689 B2 | Page 1 of 1 |
| APPLICATION NO. | : 12/559751 | |
| DATED | : January 14, 2014 | |
| INVENTOR(S) | : Finch et al. | |

It is certified that error appears in the above-identified patent and that said Letters Patent is hereby corrected as shown below:

In the Drawings

Fig. 19, Drawing Sheet 19 of 24, delete "OMPORTANT" and insert -- IMPORTANT --, therefor.

In the Specification

Column 10, Line 5, delete "panel o" and insert -- panel. --, therefor.

Column 10, Line 31, delete "user interface 116. r user interface 116." and insert -- user interface 116. --, therefor.

Column 11, Line 49, delete "stopping," and insert -- stopping --, therefor.

In the Claims

Column 14, Line 35, Claim 1, delete "consuming," and insert -- consuming --, therefor.

Column 14, Line 48, Claim 1, delete "sayings" and insert -- savings --, therefor.

Column 14, Line 49, Claim 1, delete "being;" and insert -- being --, therefor.

Column 15, Line 16, Claim 6, delete "inure" and insert -- more --, therefor.

Column 15, Line 50, Claim 9, delete "delaying," and insert -- delaying --, therefor.

Column 16, Line 39, Claim 14, delete "enemy" and insert -- energy --, therefor.

Signed and Sealed this
Twenty-fourth Day of June, 2014

Michelle K. Lee
*Deputy Director of the United States Patent and Trademark Office*